May 31, 1960
B. L. HAVENS ET AL
2,938,668
SERIAL-PARALLEL BINARY-DECIMAL ADDER
Filed Feb. 20, 1953
12 Sheets-Sheet 1
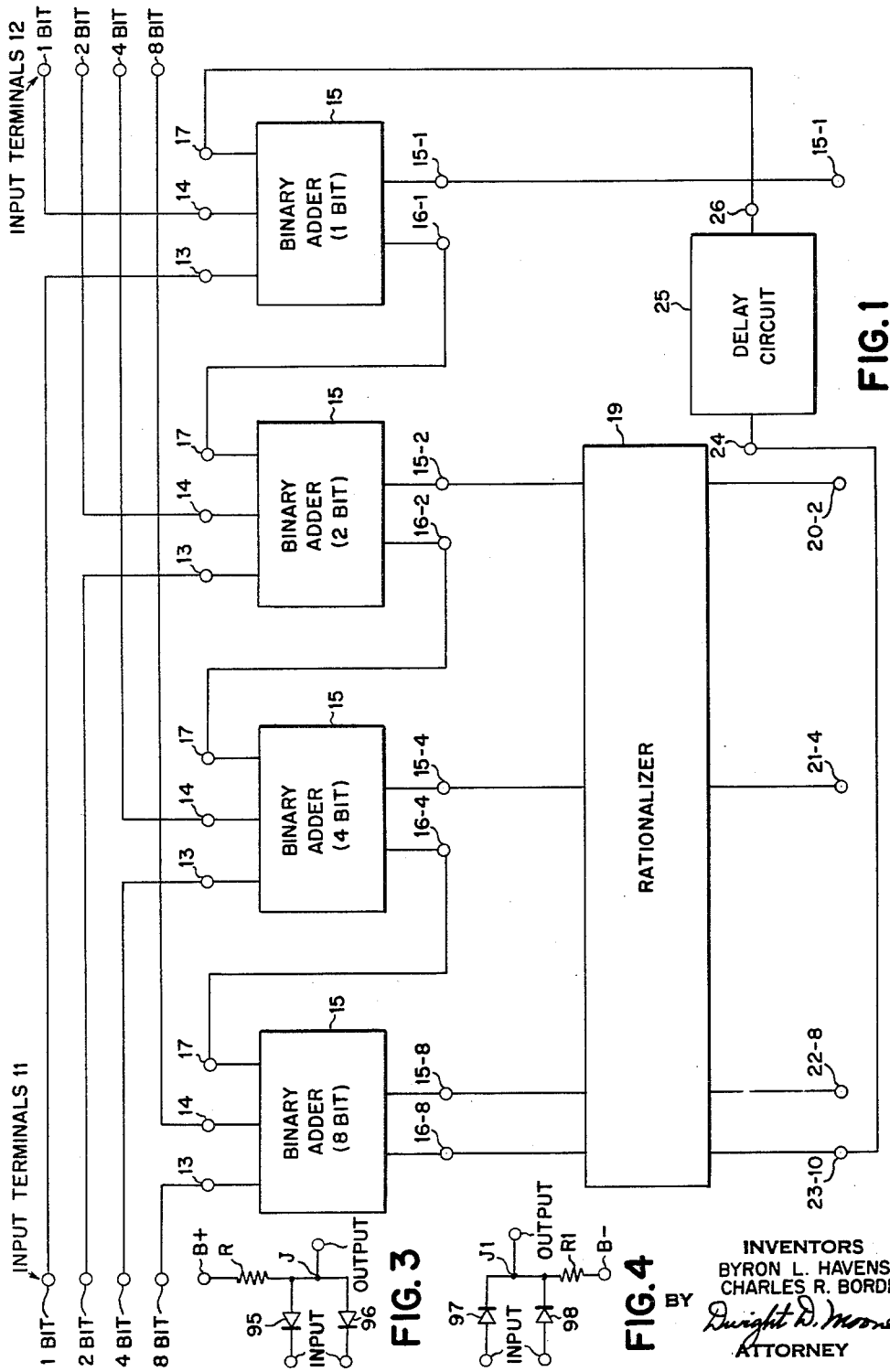
INVENTORS
BYRON L. HAVENS
CHARLES R. BORDERS
BY
Dwight D. Mooney
ATTORNEY May 31, 1960     B. L. HAVENS ET AL     2,938,668
SERIAL-PARALLEL BINARY-DECIMAL ADDER Filed Feb. 20, 1953     12 Sheets-Sheet 2

INVENTORS
BYRON L. HAVENS
CHARLES R. BORDERS

BY Dwight D. Mooney
ATTORNEY

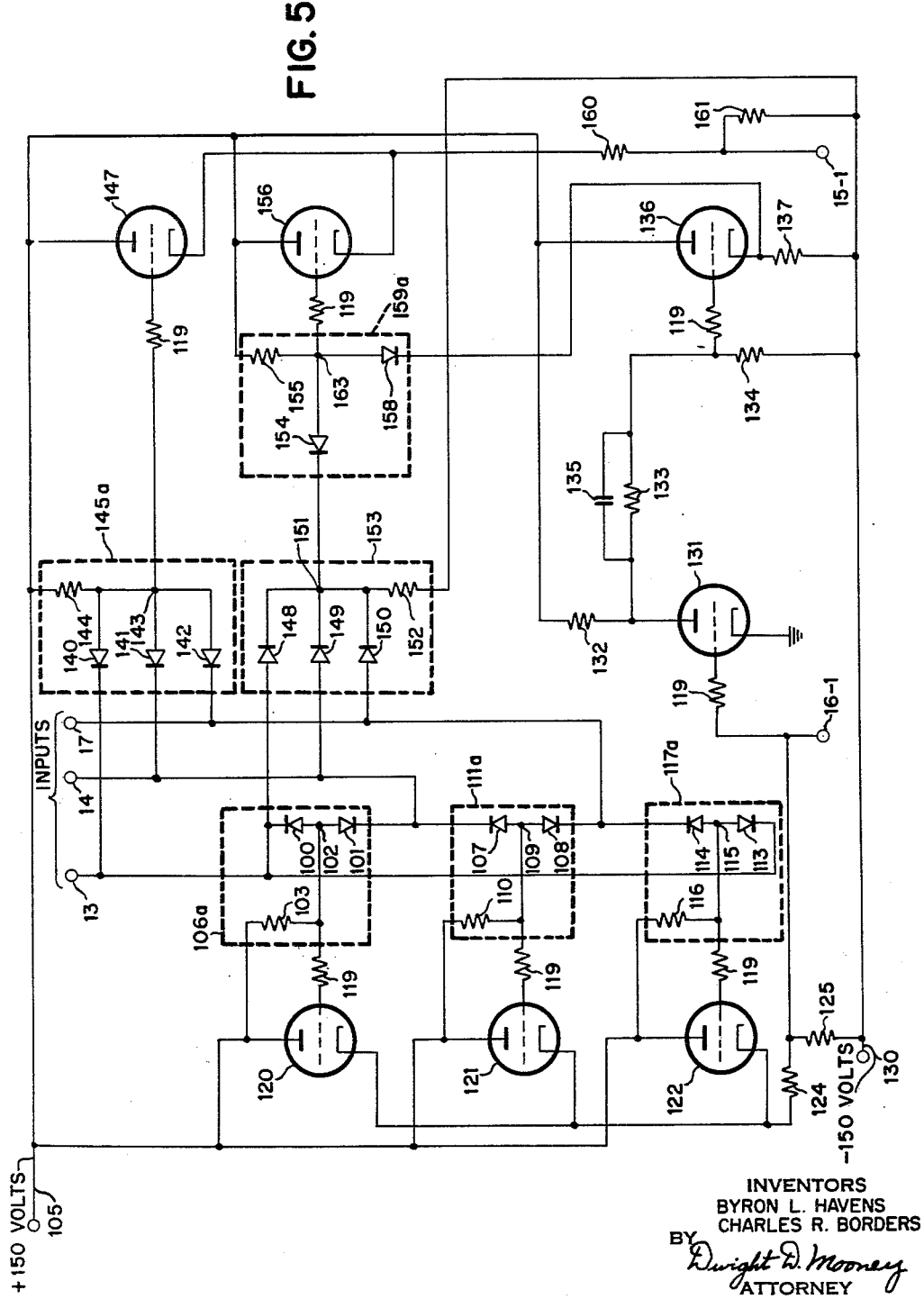

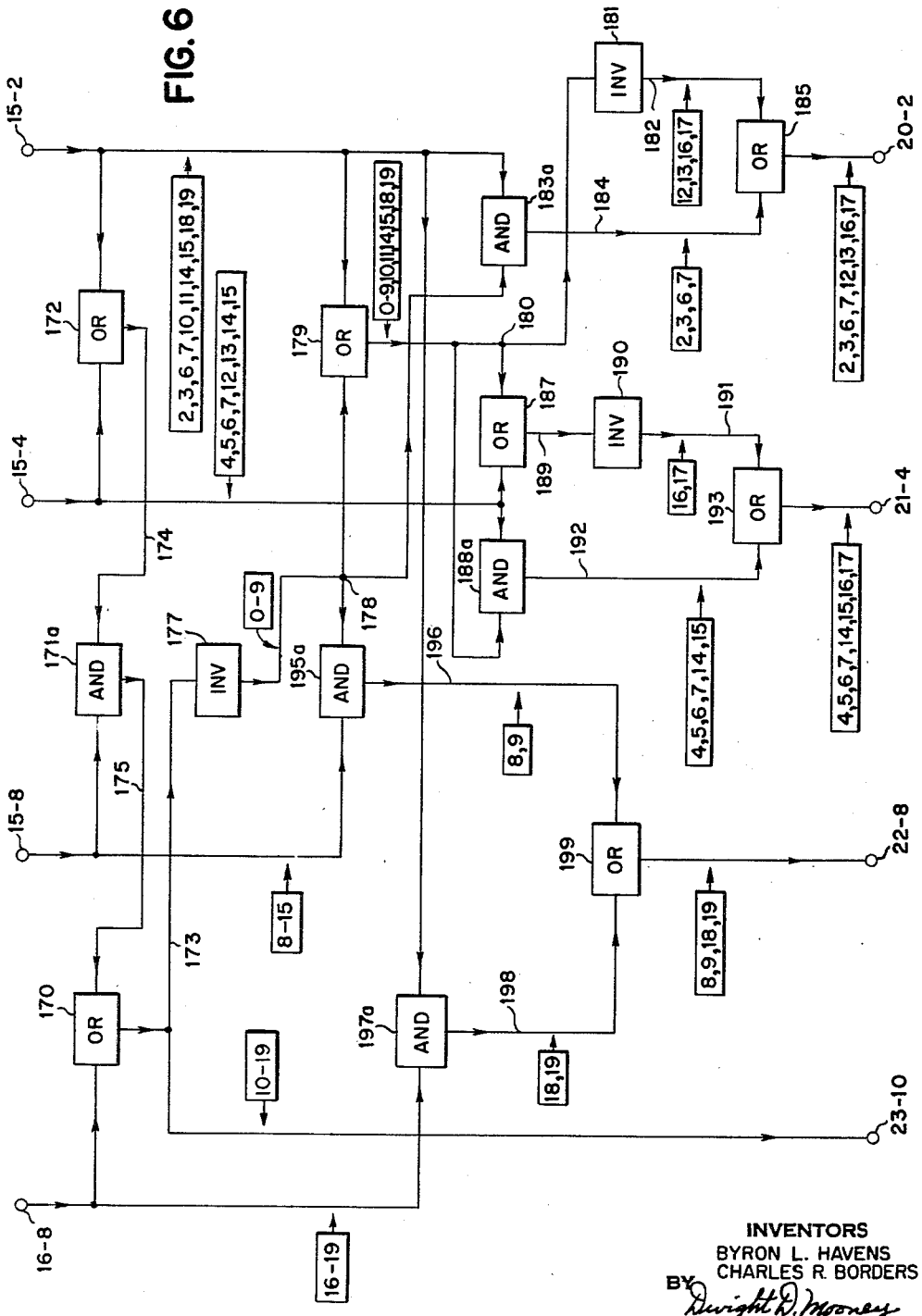

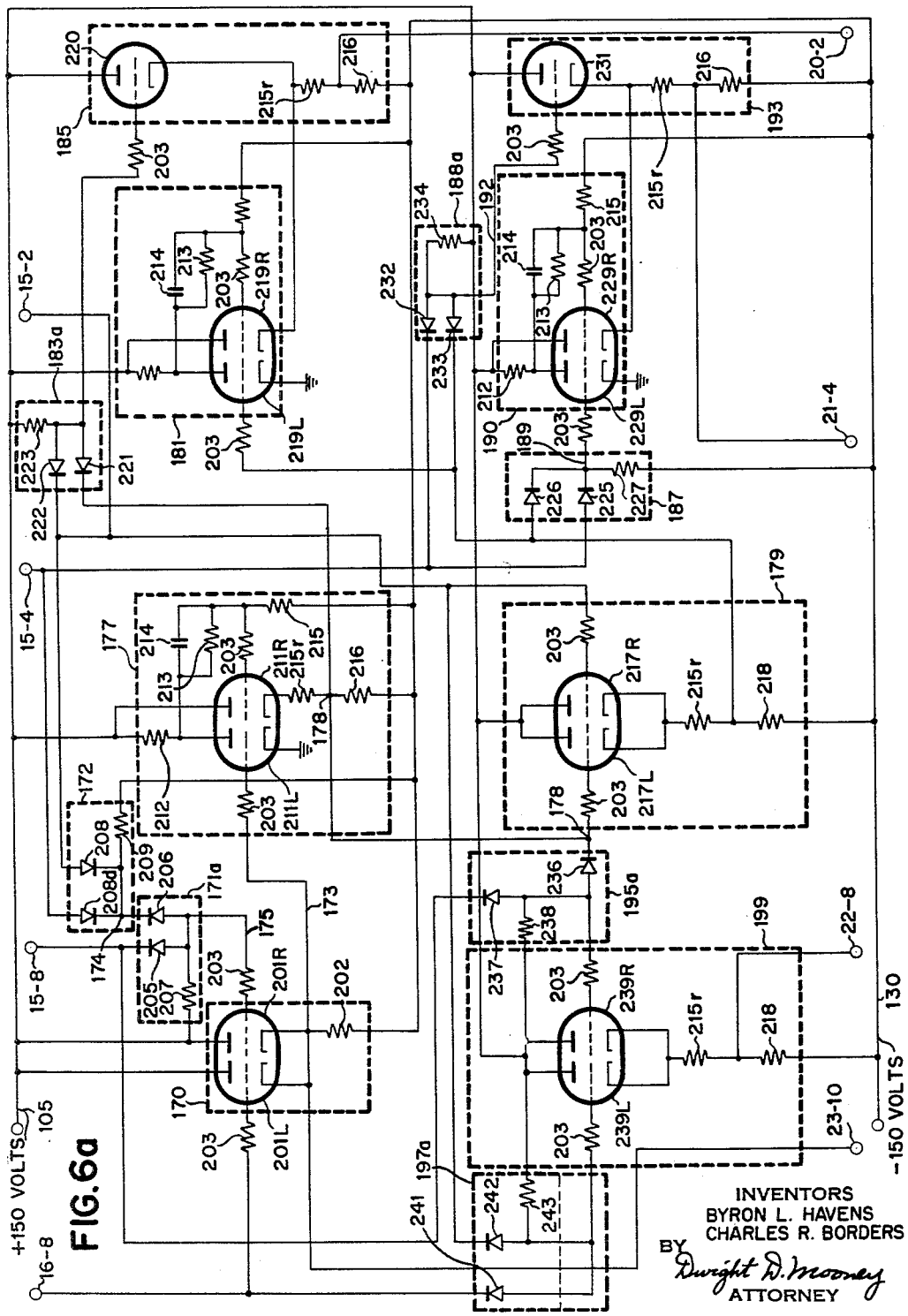

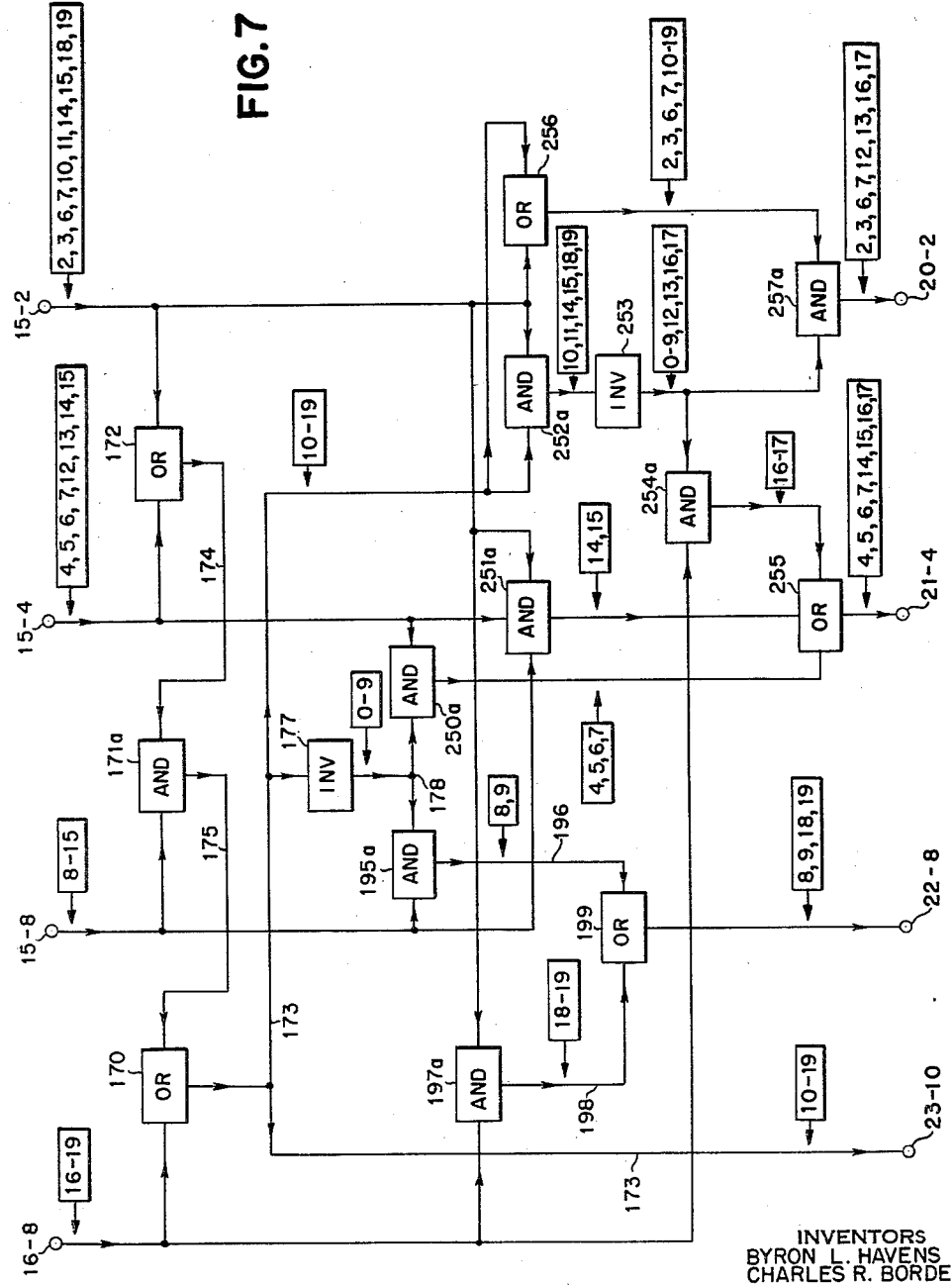

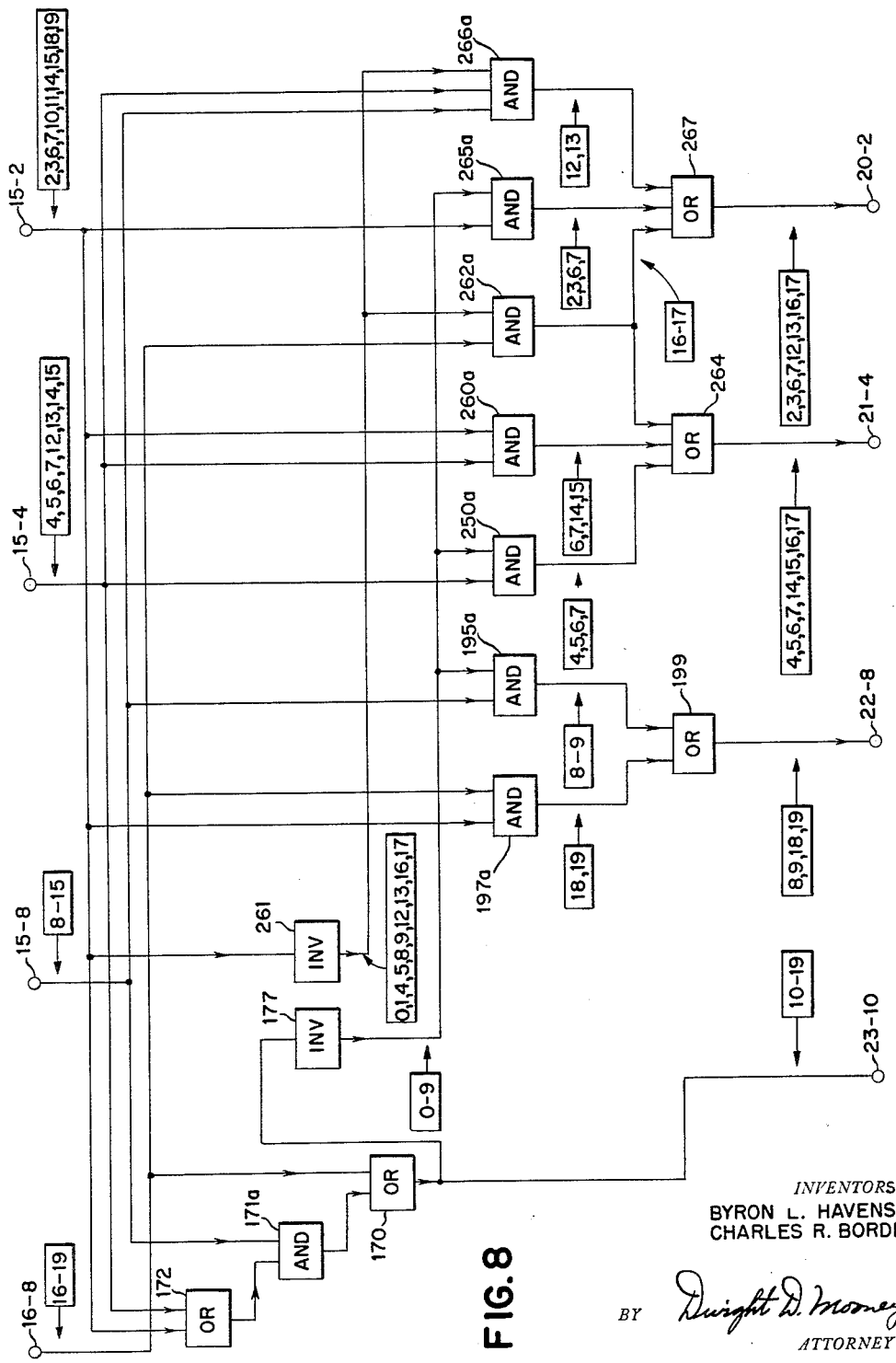

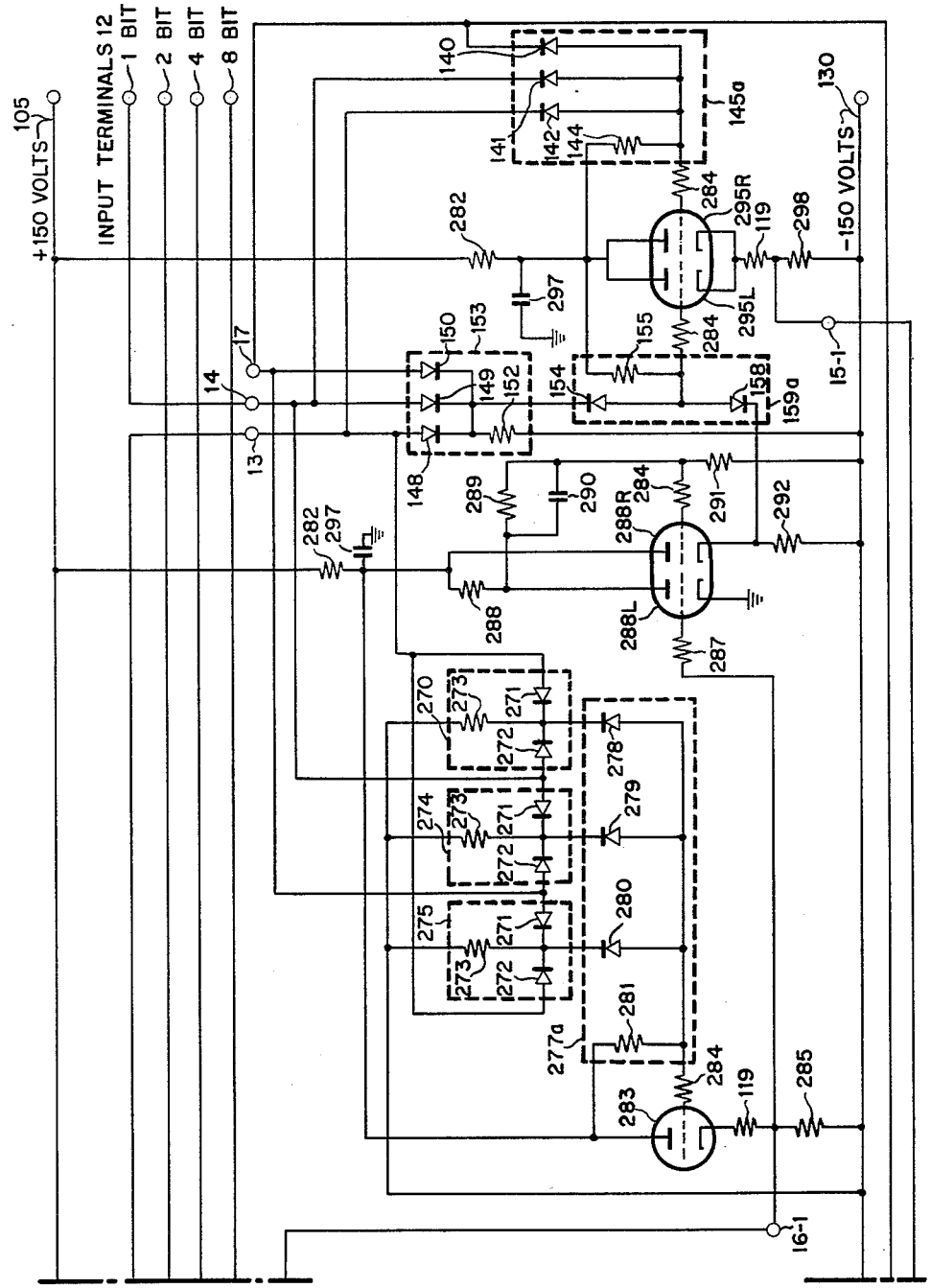

INVENTORS
BYRON L. HAVENS
CHARLES R. BORDERS
BY Dwight D. Mooney
ATTORNEY

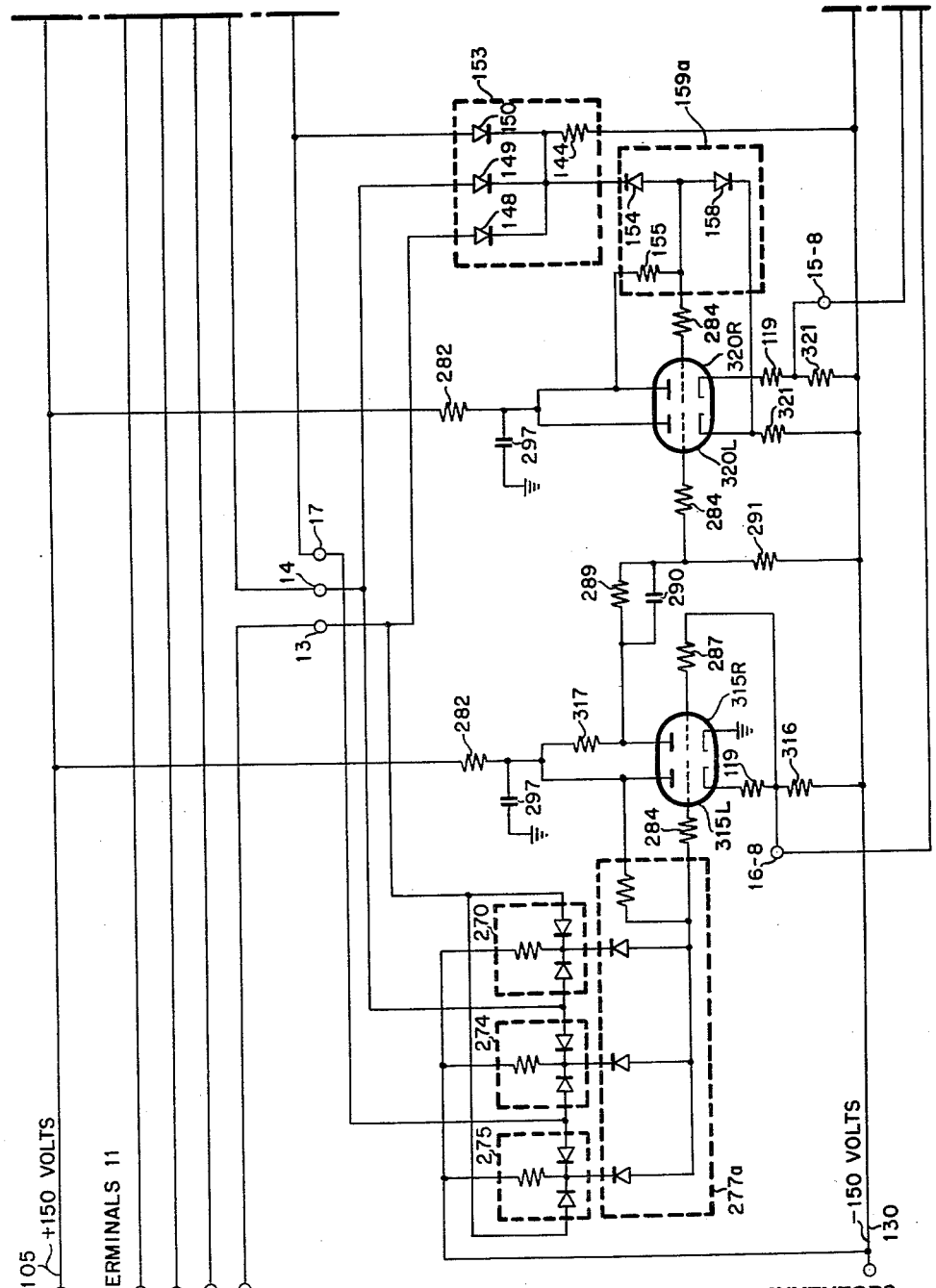

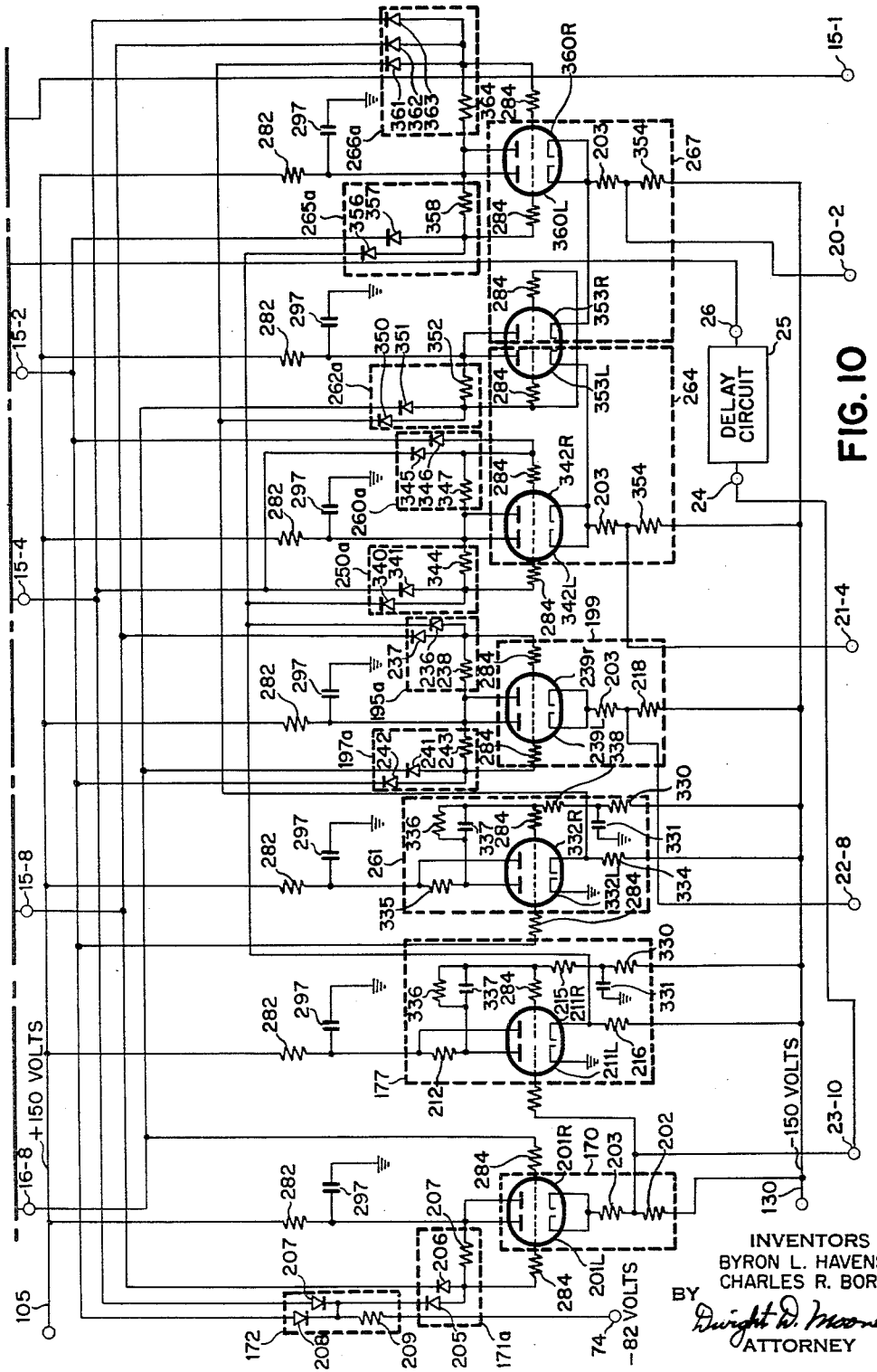

United States Patent Office 2,938,668
Patented May 31, 1960

2,938,668

SERIAL-PARALLEL BINARY-DECIMAL ADDER

Byron L. Havens, Closter, and Charles R. Borders, Alpine, N.J., assignors to International Business Machines Corporation, New York, N.Y., a corporation of New York Filed Feb. 20, 1953, Ser. No. 338,122

2 Claims. (Cl. 235—169)

This invention relates to digital adders and more particularly to a circuit for adding decimal numbers, column by column, wherein each decimal digit is represented in the pure binary-notation by time coded pulses on a plurality of wires.

In the binary notation only two digits are employed, i.e. 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16 etc. respectively. For example, binary number 1001 represents decimal digit 9 which is determined by the addition of decimal digits 1 and 8 indicated by a binary 1 in the extreme right and the left binary positions respectively. Hence, by using binary bits or pulses in groups of four wherein a pulse represents a binary 1 and the absence of a pulse represents a binary 0 any decimal digit from 0 to 9 inclusive may be written in the pure binary-notation.

The system of representing decimal numbers, digit for digit, in the pure binary notation is referred to herein as the binary-decimal system. The four consecutive binary orders, reading from right to left, represent the decimal digits 1, 2, 4 and 8 for the units decimal order and are accordingly referred to as the 1 bit, 2 bit, 4 bit and 8 bit respectively. It follows that the four binary orders of the tens decimal order represent the decimal digits 10, 20, 40 and 80 respectively. Likewise, in subsequent decimal orders, for example, the four respective binary orders of the hundreds decimal order represent the decimal digits 100, 200, 400 and 800 respectively.

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0 to 15 inclusive can be represented by a group of four binary bits. However, in the binary-decimal system, only the decimal digits 0 to 9 inclusive are represented by each group of four binary bits.

The addition of two decimal digits or a decimal column of the decimal numbers to be added may provide at most a sum of 18 plus a carry. The range of decimal sums is, therefore, 0 to 19 inclusive. As stated, if this addition is performed in the pure binary notation, and the sum is 16 or more, a carry is provided and in any case if the sum is over 9 (1001), it is not expressed in the binary-decimal system by mere binary addition. It follows that the sum, in the binary-decimal system of two decimal numbers written in the binary-decimal system, may be obtained by adding the two numbers in the pure binary notation and providing circuit means responsive to a sum greater than 9 (1001) which will reduce such sums to the appropriate digit (less than ten) and a decimal carry.

Adders for deriving the sum of decimal numbers expressed in the binary-decimal system by pure binary addition and then converting that sum to the binary-decimal system are of several types. The adder is a serial type adder if the binary bits representing the decimal digits to be added are received in succession. The adder is a parallel type adder if the binary bits representing the decimal digits to be added are received simultaneously.

A principal object of the invention is to provide a novel binary-decimal adder of the serial-parallel type.

Another object is to provide a novel serial-parallel adder for adding two decimal numbers expressed in the binary-decimal system, each digit of the decimal numbers being expressed in the pure binary notation; and producing a sum expressed in the binary-decimal notation.

A further object is to provide novel means for converting a binary sum obtained from the addition of numbers represented in the binary-decimal system to a sum expressed in the binary-decimal system.

A still further object is to provide a novel circuit means for receiving a binary sum and converting that sum to a sum expressed in the binary-decimal system without employing electrical addition of pulses.

Another object is to provide a novel binary-decimal type adder wherein the binary sum of two decimal numbers to be added is converted to the binary-decimal sum by applying the binary sum to coincidence circuitry.

Other objects of the invention will be pointed out in the following description and claims and illustrated in the accompanying drawings, which disclose, by way of examples, the principle of the invention and the best mode, which has been contemplated, of applying that principle.

In the drawing:

Fig. 1 is a block diagram of one embodiment of the invention,

Figure 2A:
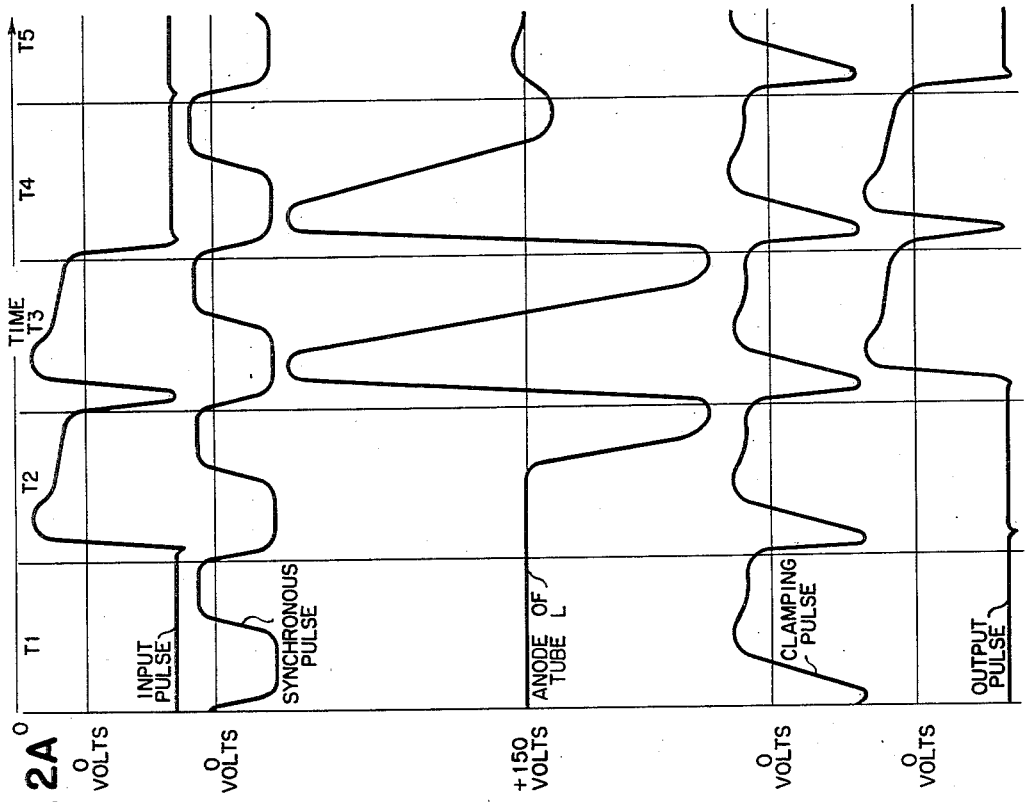
Fig. 2a shows wave forms illustrating the operation of the circuit of Fig. 2.

Fig. 3 is a circuit diagram of an AND circuit typical of the type employed by the invention, Fig. 4 is a circuit diagram of an OR circuit typical of the type employed by the invention, Fig. 5 is a circuit diagram of a binary adder which may be employed in the embodiment shown in Fig. 1, Fig. 6 is a logical diagram of one embodiment of the rationalizer shown in Fig. 1, Fig. 6a is a circuit diagram for accomplishing the functions of the logical diagram of Fig. 6, Fig. 7 is a logical diagram of another embodiment of the rationalizer shown in Fig. 1, Fig. 8 is a logical diagram of another embodiment of the rationalizer shown in Fig. 1, Figs. 9, 9a, 9b and 9c comprise a complete circuit diagram of an embodiment of the binary adders shown in Fig. 1, Fig. 10 is a circuit diagram of the embodiment of the rationalizer shown in Fig. 8, and with Figs. 9, 9a, 9b and 9c comprises a complete circuit diagram of the binary-decimal adder of the invention.

Briefly, the adder of the invention effects addition of decimal numbers expressed in the binary-decimal system. In the embodiment shown two decimal numbers are added column by column in time sequence. The binary bits representing each of the two decimal digits of the same decimal column or order are applied simultaneously to the adder. Each binary bit is applied to a separate input terminal. Four binary adders are provided to effect binary addition of corresponding or like binary bits, i.e. one adder is provided for the 1 bits, one for the 2 bits, one for the 4 bits, and one for the 8 bits. Each adder has a separate input terminal to receive each of the two bits to be added and a third or carry input terminal. Also, each adder has an output terminal at which appears the sum of the two binary bits added and a second or carry output terminal. The carry output terminal of each adder, except that for the 8 bits, is connected to the carry input terminal of the adder corresponding to the next higher numbered bit or binary order.

The output terminal of the binary adder for the 2, 4 and 8 bits and the carry output of the 8 bit adder provide the inputs to a rationalizer which, with the output of the 1 bit adder, provides a sum of the two digits of the decimal column in the binary-decimal system. If the sum of any decimal column is over 9, i.e. between 10 to 19 inclusive, the outputs from the binary adders will not be in the binary-decimal system. If such is the case, it will be indicated by the presence of carry at the carry output terminal of the 8 bit adder, or by the presence of an output at the 8 bit adder plus an output at the 4 bit adder or at the 2 bit adder. The rationalizer includes coincidence and pulse transfer circuits responsive to the existence of any of the above conditions to effect the necessary correction to provide a sum in the binary-decimal system. The output terminal of the 1 bit adder and the output terminals of the rationalizer representing the decimal digits 2, 4, 8 and 10 provide the output in the binary-decimal system. The 10 output represents the first binary order or 1 bit of the next decimal order and is therefore referred to as a carry or 10 bit. This carry output terminal or 10 bit is connected through an appropriate delay circuit to the carry input terminal of the 1 bit adder to effect carry thereto in time coincidence with the addition of the next decimal column. Hence, the delay provided by this delay circuit is equal to the time elapsing between the addition of successive decimal columns.

Referring more particularly to Fig. 1 input terminals generally designated as 11 and 12 each comprise four terminals designated as 1 bit, 2 bit, 4 bit and 8 bit respectively. The respective binary bits representing one decimal digit to be added are applied to the correspondingly designated terminal of the input terminals 11 and the respective binary bits representing the other decimal digit to be added are applied to the correspondingly designated terminal of the input terminals 12. All of these bits are applied simultaneously. For example, suppose that the decimal digits 5 and 6 occur in the same decimal column and are to be added and further that the 5 (0101) is to be applied to the input terminals 11 and the 6 (0110) is to be applied to the input terminals 12. It follows that pulses will be simultaneously applied to the 1 bit and 4 bit terminals of the input terminals 11 and to the 2 bit and 4 bit terminals of the input terminals 12.

The 1 bit terminals of both 11 and 12 are connected to the input terminals 13 and 14 of the 1 bit adder 15 having an output terminal 15–1 and a carry output terminal 16–1 connected to the carry input terminal 17 of the 2 bit adder. Similarly, the 2 bit input terminals are connected to the input terminals 13 and 14 of the 2 bit adder 15 and the carry output terminal 16–2 of the 2 bit adder is connected to the carry input terminal 17 of the 4 bit adder. The 4 bit adder is similarly connected to the 4 bit input terminals and to the carry input terminal 17 of the 8 bit adder. Each of the binary adders effects pure binary addition of the inputs applied to its three input terminals.

The output terminals 15–2, 15–4 and 15–8 of the 2 bit, 4 bit and 8 bit adders respectively and the terminal 16–8 of the 8 bit adder supply the inputs to the rationalizer 19. These inputs activate the various interconnected coincidence circuits so that the output at the terminal 15–1 of the 1 bit adder and the output terminals 20–2, 21–4, 22–8 and 23–10 of the rationalizer 19 is in the binary-decimal system, the particular output at any one of these terminals representing the designated decimal suffix thereof. Hence, if the terminal 23–10 is Up it indicates the presence of the decimal digit 10 or the first binary bit of the next decimal order to be added. This carry terminal 23–10 is therefore connected to the input terminal 24 of a delay circuit 25 whose output terminal 26 is connected to the carry input terminal 17 of the 1 bit adder to provide a carry pulse into the next decimal column to be added. This carry pulse or 10 bit is applied to the terminal 17 simultaneously with the application of inputs to the terminals 11 and 12 for the next decimal digits or column to be added.

Various circuits used herein or particular points within the circuits are frequently referred to as Up or Down. Up means that the voltage present at the particular point or at the output of the circuit designated is positive with respect to ground. Down means that the voltage present at the particular point or at the output of the circuit designated is negative with respect to ground. If the control grid of a vacuum tube is referred to as Down, it means that the voltage at that control grid is below the cutoff value for the vacuum tube.

Numerous coincidence circuits are employed herein. An AND circuit refers to a circuit which is operable to produce a positive voltage at its output terminal only when all of the input terminals thereof have a positive voltage applied thereto simultaneously. An OR circuit refers to a circuit operable to produce a positive voltage at its output terminal when only one or a plurality of the input terminals thereof has a positive voltage applied thereto.

The invention utilizes numerous dual-type tubes having two tube sections in a single envelope. Each such section is referred to herein as a tube and designated by a number followed by the letter L or R or simply by the letters L and R to indicate the left-hand or right-hand tube section respectively. A tube so referred to is similarly designated thereafter if employed with the same immediate circuitry and for the same purpose even though it is not shown with its corresponding L or R tube.

Figure 2:
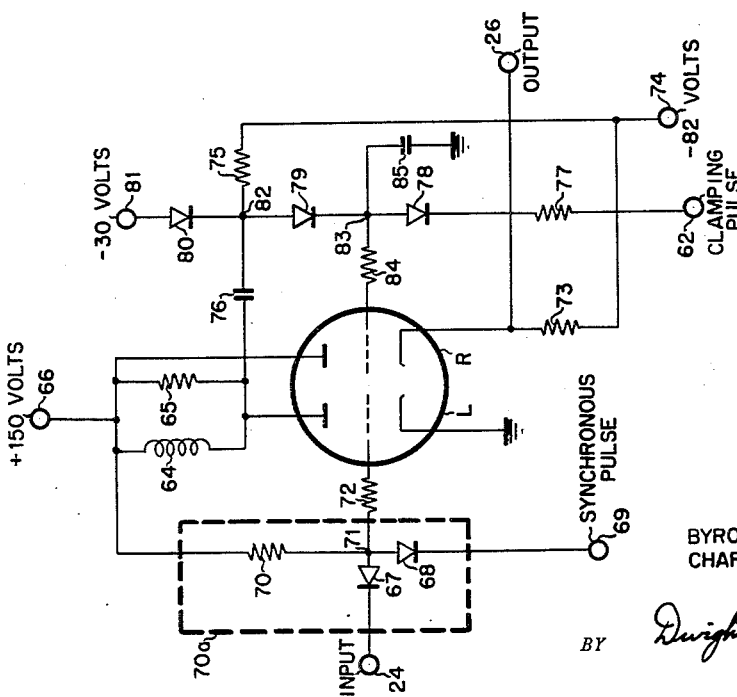
Fig. 2 is a circuit diagram of a delay circuit suitable for use in the embodiment shown in Fig. 1.

Referring more particularly to Figs. 2 and 2a, the delay circuit 25 actually used in Fig. 1 will be described. This circuit is claimed in the U.S. patent of Byron L. Havens, No. Re. 23,699, granted August 18, 1953. The curves of Fig. 2a demonstrate the operation of the circuit shown in Fig. 2. In order to facilitate the description, the time axis (abscissa) is divided into equal time intervals designated T1, T2, T3, T4 and T5 respectively. The length of each of these time intervals is dependent upon the particular circuit design and as used herein is equal to the time elapsing between the initiation of the addition of one decimal column and the initiation of the addition of the next decimal column to be added. As one example, each time interval may be of approximately one microsecond duration.

Briefly, an input pulse (Fig. 2a) is applied to the input terminal 24 of the circuit shown in Fig. 2 during one preselected time interval and produces an output pulse (Fig. 2a) at the output terminal 26 during the next subsequent time interval. An input pulse may be applied to the input terminal 24 during the same time interval, T3 for example, that an output pulse is produced at the output terminal 26. The flyback produced by an input pulse is used to set up the output pulse and the circuitry is such that there is complete isolation between the output and input pulse during any given time interval.

A clamping pulse (Fig. 2a) is applied to the terminal 62 to wipe out or remove the information stored after that information has been utilized.

The anode of tube L is connected through inductance 64 and an anode load resistor 65 in parallel to a +150 volt terminal 66. The inductance 64 is provided to increase the voltage swing in the positive direction at the anode of the tube L (Fig. 2a during T3 and T4) for a preselected time immediately after that tube is rendered non-conductive.

The diode rectifiers 67 and 68 connected respectively to input terminal 24 and terminal 69, and the resistor 70 connected between the juncture 71 of the diodes 67 and 68 and the +150 volt terminal 66 comprise an AND circuit generally designated as 70a. This juncture 71 is connected through a parasitic suppressor resistor 72 to the control grid of the tube L.

The tube R is operated as a cathode follower and is always conductive during operation of the delay circuit. The cathode load resistor 73 is connected to a —82 volt terminal 74 which is also connected through a resistor 75 and a condenser 76 to the anode of the tube L. The terminal 62 is connected through a resistor 77 and diode rectifiers 78, 79, and 80, in series, to a —30 volt terminal 81. The juncture 82 is the connection between the rectifier 79 and 80 and between the resistor 75 and condenser 76. The juncture 83 joining rectifiers 78 and 79 is connected through a parasitic suppressor resistor 84 to the control grid of the tube R and through a condenser 85 to ground.

During the time interval T1, an input pulse is not applied to the input terminal 24 and juncture 71 is therefore Down so that a positive voltage is not applied to the control grid of the tube L. During this time interval the tube L is non-conductive, tube R is conductive, and output terminal 26 is Down. The voltage at the anode of tube L is +150 volts and the condenser 76 is charged with 180 volts appearing across it, the left plate is at +150 volts and the right plate is at —30 volts. The juncture 82 cannot be appreciably more negative than the —30 volt terminal 81 because when such is attempted the rectifier 80 conducts and maintains the voltage at juncture 82 to essentially that of the terminal 81. It is the conduction of rectifier 80 during the time interval T1 that keeps juncture 82 at approximately —30 volts. The resistor 75 tends to prevent the voltage at juncture 82 from drifting between the application of successive lamping pulses.

The juncture 83 is also at —30 volts and condenser 85 is charged with —30 volts on its upper plate and its lower plate is at zero volts (ground). Rectifier 79 conducts when condenser 85 is being charged and when the clamping pulse (Fig. 2a) applied to the terminal 62 attempts to pull the juncture 83 below —30 volts, the voltage at the terminal 81. Hence, when the clamping pulse is most negative, the voltage at the control grid of the tube R has been pulled Down, and since tube R is a cathode follower, the voltage at the output terminal 26 is also pulled Down.

This action effects the wiping out of the information stored after that information has been used. In other words, the output pulse produced is brought to an end as shown at the beginning of time intervals T4 and T5 (Fig. 2a). When the clamping pulse thus goes negative the rectifier 78 is rendered conductive.

During the latter portion of time interval T2 the input pulse and synchronous pulse are both positive simultaneously. The juncture 71 is therefore UP and the tube L becomes heavily conductive and the voltage at its anode decreases rapidly (Fig. 2a). The condenser 76 discharges through the tube L. The resulting tendency of juncture 82 to acquire the same voltage increment as the anode of the tube L is arrested by the conduction of rectifier 80 and the voltage at this juncture remains —30 volts.

Just at the start of time interval T3 both the input pulse and synchronous pulse go negative and the voltage at the juncture 71 and control grid of tube L accordingly goes Down and tube L is rendered non-conductive. As a result, the voltage at the anode of the tube L increases rapidly and actually exceeds +150 volts because this anode circuit is less than critically damped during the flyback time. It is this increased voltage or flyback, which initiates the output pulse. This voltage is transferred through condenser 76 to cause the voltage at juncture 82 to go Up (to approximately +5 volts) from —30 volts. The rectifier 79 then conducts to cause the juncture 83 and control grid of tube R is go Up and the upper plate of condenser 85 is charged positive relative to its lower or grounded plate. The voltage at the output terminal 26 connected to the cathode of the tube R follows the control grid thereof and goes Up to initiate the output pulse during the time interval T3.

As the voltage at the anode of the tube L decreases toward +150 volts the voltage at juncture 82 similarly decreases. During the latter portion of time interval T3 the voltage at the juncture 82 is again approximately —30 volts. Both the terminals 24 and 69 again go positive as shown by the second input pulse and synchronous pulse which occur during the latter part of time interval T3 while the output terminal 26 is still Up.

As a result the tube L again becomes heavily conductive and the voltage at its anode decreases and the juncture 82 again remains at —30 volts because of the conduction through rectifier 80.

When the clamping pulse goes negative at the start of time interval T4, conduction through rectifiers 78, 79 and 80 results and juncture 83 as well as juncture 82 is placed at approximately —30 volts. The control grid of tube R and output terminal 26 therefore go Down and the output pulse, occurring during time interval T3 produced in response to the input pulse applied during time interval T2, is terminated.

When the juncture 71 goes Down at the start of time interval T4, the tube L becomes non-conductive and its anode voltage starts to increase rapidly as described hereinbefore.

This increased voltage causes the juncture 82 to go Up, the juncture 83 to go Up and the output terminal 26 to go Up as indicated by the output pulse occurring during time interval T4. The voltage at the anode of the tube L finally settles, during the time interval T5, at a steady value of +150 volts in accordance with the damping effect. If an input pulse was applied during the time interval T4, the voltage at the anode of tube L would never reach a steady value of +150 volts. Such is indicated by this anode voltage during the time interval T3.

Just prior to the anode of tube L reaching a steady voltage value the clamping pulse goes negative (time interval T5). At this time the juncture 82 has again assumed a voltage value of —30 volts but the juncture 83 is still Up. When the clamping pulse causes the terminal 62 to go negative the rectifiers 78, 79 and 80 are rendered conductive and the voltage at the juncture 83 goes Down to terminate the output pulse at the beginning of time interval T5.

It is now clear that the use of flyback makes possible the production of an output pulse in one preselected time interval in response to an input pulse received during the next prior time interval and that rectifier circuitry and a clamping pulse are employed to effect isolation between input and output circuits simultaneously operable.

It is understood that any suitable delay circuit may be employed by the invention and that the various voltage values were given merely to facilitate the description and understanding of the circuit operation. Also, the particular values of the circuit components used will vary in accordance with the particular operation the delay circuit is required to perform.

Fig. 3 shows an AND circuit typical of the type employed by the invention. The resistor R connected between the juncture J and the source of positive voltage B+ tends to pull the juncture J up to the positive voltage B+. The plates of the diode rectifiers 95 and 96 are connected to juncture J and the cathodes of these rectifiers are connected to the respective input terminals. Hence, the voltage at J can be no higher than the lower of the two voltages at the input terminals. The voltage at J will change only if the increased voltage is present at the more negative of the two input terminals. In such case, the voltage at J will rise until it reaches this increased voltage value. It is seen, therefore, that when both of the input terminals are Up, J and consequently the output terminal connected thereto is Up. Obviously, additional diodes may be connected between corresponding input terminals and the juncture J and the juncture will be Up only when all input terminals are Up.

Fig. 4 shows OR circuit using diode rectifiers 97 and 98. The resistor R1 connected between the juncture J1 and a source of negative voltage B— tends to pull down the voltage at J1 to a value equal to that of B—. The cathodes of the diodes are connected to juncture J1 and the plates of these diodes are connected to respective input terminals. Hence, the voltage at J1 can be no lower than the higher of the voltages at the input terminals. The voltage at J1 increases in accordance with the more positive voltage at the input terminals. Hence, when either of the input terminals is Up the terminal J and consequently the output terminal connected thereto is Up. Obviously, additional diodes may be connected between corresponding input termnials and the juncture J1 and the juncture will be Up when any one or more of the input terminals is Up.

Referring more particularly to Fig. 5 the novel circuit shown effects addition in true binary fashion. As stated the presence of a pulse at one of the input terminals 13, 14 and 17 indicates the presence of binary 1 and the absence of a pulse thereat indicates a binary 0. Hence, to effect addition in true binary fashion the output terminal 15–1 must exhibit a binary 0 when no input pulse is applied to the input terminals 13, 14 and 17, a binary 1 when an input pulse is applied to one input terminal, a binary 0 and a binary 1 carry when pulses are applied to two input terminals, and a binary 1 and a binary 1 carry when pulses are applied to all three input terminals. These functions are performed by the circuitry shown.

Diode rectifiers 100 and 101 have their cathodes connected to the input terminals 13 and 14 respectively and their plates commonly connected at juncture 102 which is connected through a pull up resistor 103 to the +150 volt line 105. The rectifiers 100 and 101 and the resistor 103 comprise an AND circuit 106a. When the input terminals 13 and 14 are Up the juncture 102 is Up. Similarly, the diode rectifiers 107 and 108 are connected between the input terminals 14 and 17 and the common juncture 109 is connected through pull up resistor 110 to the +150 volt line 105. The diode rectifiers 107 and 108 and the pull up resistor 110 comprise an AND circuit designated as 111a.

The diode rectifiers 113 and 114 are connected between the input terminals 13 and 17 and their common juncture 115 is connected through pull up resistor 116 to the +150 volt line 105. The rectifiers 113 and 114 and pull up resistor 116 comprise an AND circuit 117a. The respective junctures 102, 109 and 115 are connected through the parasitic suppressor resistors 119 to the control grid of the tubes 120, 121 and 122 respectively. The plates of each of these tubes are connected to the +150 volt line 105 and their cathodes are commonly connected through a dropping resistor 124 and a load resistor 125 to the —150 volt line 130. The resistor 125 is a common load resistor for each of the cathode follower tubes 120, 121 and 122 and the dropping resistor 124 is provided to compensate for the cathode follower bias and thereby keep the cathodes of those tubes at approximately the same voltage as the most positive of their control grids. Since the cathodes of the tubes 120, 121 and 122 are commonly connected, the carry output terminal 16–1 is Up when one or more of the grids of the tubes 120, 121 and 122 are Up. These tubes 120, 121 and 122 therefore comprise a cathode follower type OR circuit. If any two of the input terminals 13, 14 and 17 are Up, the corresponding AND circuit is rendered effective to cause the carry output terminal 16–1 to go Up. For example, if the input terminals 13 and 14 go Up, the juncture 102 of AND circuit 106a goes Up, the control grid of the tube 120 connected thereto goes Up, the cathode of tube 120 goes Up and the carry output terminal 16–1 goes Up. Also, if all three of the input terminals 13, 14 and 17 go Up, the junctures 102, 109 and 115 of AND circuit 106a, 111a and 117a, respectively, all go Up. The control grids of cathode follower tubes 120, 121 and 122 all go Up and carry output terminal 16–1 goes Up. Hence, if an input is present at two or three of the input terminals 13, 14 and 17, a carry output is provided. This complies with the rules of binary addition.

The carry output terminal 16–1 is also connected through a parasitic suppressor resistor and grid current limiting resistor 119 to the control grid of inverter tube 131 having a grounded cathode and its plate connected through load resistor 132 to the +150 volt line 105. The plate of inverter tube 131 is also connected through a voltage divider comprising resistors 133 and 134 to the —150 volt line 130. A frequency compensating condenser 135 is connected, in parallel, with the resistor 133 and the juncture of resistors 133 and 134 is connected through a parasitic suppressor resistor 119 to the control grid of the cathode follower tube 136 having its cathode connected through a load resistor 137 to the —150 volt line 130 and its plate connected to the +150 volt line 105. The control grid of the inverter tube 131 is connected to the carry output terminal 16–1 and is therefore Up when two or three of the input terminals 13, 14 and 17 are Up. It follows that the plate of the inverter tube 131 is Up when one of the input terminals 13, 14 and 17 is Up or when none of those terminals is Up. The cathode of the cathode follower tube 136 follows its grid and is therefore Up when one input is present or when no input is present.

The cathodes of diode rectifiers 140, 141 and 142 are connected to the input terminals 13, 14 and 17 respectively and their plates connected to a common juncture 143 which is connected through a pull up resistor 144 to the +150 volt line 105. Rectifiers 140, 141 and 142 and pull up resistor 144 comprise an AND circuit 145a. The juncture 143 of AND circuit 145a is connected through parasitic suppressor resistor 119 to the control grid of the cathode follower tube 147 having its plate connected to the +150 volt line 105.

The diode rectifiers 148, 149 and 150 have their plates connected to the input terminals 13, 14 and 17 respectively and their cathodes connected to a common juncture 151 which is connected through a pull down resistor 152 to the —150 volt line 130. The rectifiers 148, 149 and 150 and resistor 152 comprise an OR circuit 153. The juncture 151 or the output of OR circuit 153 is connected to the cathode of diode 154 having its plate connected through pull up resistor 155 to the +150 volt line 105 and through parasitic suppressor resistor 119 to the control grid of cathode follower 156.

Diode rectifier 158 has its plate connected to the plate of rectifier 154 and its cathode connected to the cathode of cathode follower 136. Diode rectifiers 154 and 158 and pull up resistor 155 comprise an AND circuit 159a.

The cathodes of cathode follower tubes 147 and 156 effectively comprise an OR circuit since they are commonly connected through a dropping resistor 160 and a load resistor 161 to the —150 volt line 130. The juncture at resistors 160 and 161 is connected to output terminal 15–1.

The juncture 143 of AND circuit 145a is Up only when all three of the input terminals 13, 14 and 17 are Up, i.e. only when three inputs are applied. As a result the control grid of cathode follower tube 147 goes Up and its cathode follows to cause the output terminal 15-1 to go Up when three inputs are present. The juncture 151 of OR circuit 153 goes Up when one or more of input terminals 13, 14 and 17 go Up. The cathode of cathode follower tube 136 goes Up when one input or no input is present. Hence, the juncture 163 of AND circuit 159a goes Up only when one of the input terminals 13, 14 and 17 is Up. When the juncture 163 of AND circuit 159a goes Up the grid and cathode of cathode follower tube 156 go Up and the output terminal 15-1 goes Up. Hence, output terminal 15-1 goes Up when one or three inputs are applied to the input terminals 13, 14 and 17.

The circuit of Fig. 5 therefore provides an output sum and carry strictly in accordance with the rules of binary addition. Also, as shown hereinbefore, a carry output is provided at terminal 16-1 when two or three binary 1's are added, but not when a single binary 1 is present.

The output and carry terminal designations 15-1 and 16-1, respectively, indicate that the binary adder of Fig. 5 corresponds to the 1 bit adder shown in Fig. 1. It is clear that the 2, 4 and 8 bit adders of Fig. 1 are similar, the only difference being in the designation of the output and carry terminals.

The 8 bit adder of Fig. 1 need not be a complete binary adder as previously described, since it will not be possible to have three input pulses applied simultaneously. Three such inputs would correspond to a sum of 24 or more, and 19 is the largest sum possible from the addition of two numbers in binary-decimal system with a carry from a previous column. For this reason the AND circuit and cathode follower, corresponding to 145a and 147, respectively, in Fig. 5, may be omitted in the 8 bit adder of Fig. 1.

The logical or block diagram of the rationalizer shown in Fig. 6 will be described in connection with Table I below.

Table I

| Decimal Number | Corresponding Designation in Pure Binary Notation | Corresponding Designation in Binary-Decimal System |
|---|---|---|
| 0 | 0000 | 0000 |
| 1 | 0001 | 0001 |
| 2 | 0010 | 0010 |
| 3 | 0011 | 0011 |
| 4 | 0100 | 0100 |
| 5 | 0101 | 0101 |
| 6 | 0110 | 0110 |
| 7 | 0111 | 0111 |
| 8 | 1000 | 1000 |
| 9 | 1001 | 1001 |
| 10 | 1010 | 1,0000 |
| 11 | 1011 | 1,0001 |
| 12 | 1100 | 1,0010 |
| 13 | 1101 | 1,0011 |
| 14 | 1110 | 1,0100 |
| 15 | 1111 | 1,0101 |
| 16 | 1,0000 | 1,0110 |
| 17 | 1,0001 | 1,0111 |
| 18 | 1,0010 | 1,1000 |
| 19 | 1,0011 | 1,1001 |

The input terminals 15-2, 15-4, 15-8 and 16-8 correspond to similarly numbered terminals of Fig. 1. The middle column of Table I represents, in the binary notation, the corresponding or oppositely placed decimal number of the left-hand column and the extreme right-hand column designated the corresponding decimal numbers in the binary-decimal system. In the middle column the second binary column from the right represents the input to the terminal 15-2, the third column, the input to the terminal 15-4, the fourth column, the input to the terminal 15-8 and the fifth column, the input to the terminal 16-8. In the right-hand column of Table I, the second binary column from the right indicates the output at the terminal 20-2, the third binary column, the output from the terminal 21-4, the fourth binary column, the output from the terminal 22-8 and the fifth, the output from the terminal 23-10. The output from the terminal 15-1 (Fig. 1) is represented by the right-hand binary column or order of the middle and right-hand columns of Table I. It is evident that the right-hand binary column in the binary-decimal system is identical to that in the pure binary notation, consequently no conversion of the 1 bit is ever required, regardless of the sum. Thus, the 1 bit of the sum need not enter the rationalizer.

As stated hereinbefore, the sum derived from the addition of any decimal column must lie between 0 to 19 inclusive. This sum is derived by the binary bit adders of Fig. 1 and appears at the output terminals of those adders in the binary notation as shown by the middle column of Table I. The rationalizer converts this sum to the binary-decimal system as indicated by the right-hand column of Table I if such conversion is required, i.e. if the sum is over 9 (1001).

By referring to the middle column of Table I it can be seen by inspection of the second binary column from the right that the terminal 15-2 is Up when the decimal sum is either 2, 3, 6, 7, 10, 11, 14, 15, 18 or 19. From the third binary column it is seen that the input terminal 15-4 is Up when the decimal sum is either 4, 5, 6, 7, 12, 13, 14 or 15. From the fourth binary column it is seen that the terminal 15-8 is Up when the sum is between 8 to 15 inclusive, and from the fifth column it is seen that the terminal 16-8 is Up when the sum is between 16 to 19 inclusive. Since these terminals must be either Up or Down, they are Down when any sum other than that indicated above is present.

The decimal sums which cause these terminals to be Up are indicated in the figures of the drawing, which figures are enclosed in a rectangle and directed by an arrow toward the lead connected to the terminal to which they apply. The Up condition of various other points in the circuit are similarly designated.

In Fig. 6 the OR circuit 170, AND circuit 171a and OR circuit 172 are provided to detect sums greater than 9 (1001). All such numbers are indicated by the terminal 16-8 being in the Up condition or the terminal 15-8 being in the Up condition simultaneously with the terminal 15-4 or 15-2 being in the Up condition. If any of these three conditions is present, the lead 173 connected to the output terminal 23-10 is Up and a carry or 10 bit is present. If the terminal 16-8 is Up, the OR circuit 170 connected between the terminal 16-8 and lead 173 functions to cause lead 173 to go Up. OR circuit 172 is connected between terminals 15-2 and 15-4. Hence, its output lead 174 connected to an input of AND circuit 171a is Up if either of those terminals is Up. The other input of AND circuit 171a is connected to terminal 15-8. Hence, if the terminal 15-8 and terminal 15-4 or the terminal 15-8 and the terminal 15-2 are Up, the output lead 175 of AND circuit 171a is Up. Lead 175 provides one input to the OR circuit 170. Hence, when lead 175 is Up, OR circuit 170 functions to cause lead 173 to go Up. Hence, if a 16 (1,0000), or an 8 (1000) plus a 4 (0100) or a 2 (0010) are present, the terminal 23—10 is Up to provide a carry pulse or a 10 bit.

Lead 173 supplies the input to inverter 177. The juncture 178 or output of inverter 177 is therefore Up if the sum is between 0 to 9 inclusive. The juncture 178 and the input terminal 15-2 supply the inputs to OR circuit 179. The juncture 180 or output of OR circuit 179 is therefore Up when either the juncture 178 or the terminal 15-2 is Up which corresponds to the condition when the sum is either 0 to 9, 10, 11, 14, 15, 18 or 19. The juncture 180 supplies the input to inverter 181 and its output lead 182 is therefore Up when its input is Down and vice versa. The lead 182 is therefore Up when the sum is either 12, 13, 16 or 17. The juncture 178 and the terminal 15-2 supply the two inputs to the AND circuit 183a and the output lead 184 of AND circuit 183a is Up only when both of its inputs are Up or when the sum is either 2, 3, 6 or 7. Leads 182 and 184 supply the inputs to OR circuit 185. The output of OR circuit 185 is applied to terminal 20-2 which is Up when either of the leads 182 and 184 is Up or when the sum is either 2, 3, 6, 7, 12, 13, 16 or 17. Juncture 180 and terminal 15-4 supply the inputs for the OR circuit 187 and the AND circuit 188a. The output lead 189 connected to OR circuit 187 is therefore Up when either juncture 180 or terminal 15-4 is Up or when the sum is either 0 to 15, 18 or 19. Lead 189 supplies the input to inverter 190 whose output lead 191 is Up when its input is Down or when the sum is either 16 or 17. The output lead 192 connected to AND circuit 188a is Up only when both the input terminal 15-4 and juncture 180 are Up or when the sum is either 4, 5, 6, 7, 14 or 15. Leads 191 and 192 supply the inputs to OR circuit 193. The output terminal 21-4 connected to the output of OR circuit 193 is therefore Up when either one of the leads 191 or 192 is Up or when the sum is either 4, 5, 6, 7, 14, 15, 16 or 17. Input terminal 15-8 and juncture 178 supply the inputs to AND circuit 195a whose output lead 196 is Up only when the terminal 15-8 and the juncture 178 are Up or when the sum is 8 or 9. The inputs to AND circuit 197a are supplied by the input terminals 15-2 and 16-8 and its output lead 198 is Up only when both those terminals are Up or when the sum is either 18 or 19. Leads 196 and 198 supply the inputs for OR circuit 199. The output terminal 22-8 connected to the output lead of OR circuit 199 is therefore Up when either of the leads 196 or 198 is Up or when the sum is 8, 9, 18 or 19.

The output terminals 15-1 (Fig. 1), 20-2, 21-4, 22-8, and 23-10 supply an output representing the sum in the binary-decimal system of the two decimal digits applied in the binary-decimal system to inputs 11 and 12 (Fig. 1) plus the carry, if any, from the previous addition of decimal digits. This is readily seen by reference to the right-hand column of Table I. The right or first binary column thereof appears at terminal 15-1 (Fig. 1) as a result of the normal binary addition effected in the 1 bit adder 15 (Fig. 1). The second binary column from the right shows that a binary 1 is present when the decimal sum is 2, 3, 6, 7, 12, 13, 16 or 17. Such is in correspondence with the Up condition of terminal 20-2. Similar comparison of the third, fourth, and fifth binary columns with the Up condition of terminals 20-4, 22-8 and 23-10, respectively, indicates that the output produced at the terminals 15-1, 20-2, 21-4, 22-8 and 23-10 is in the binary-decimal system as indicated by the third column of Table I.

Referring to Fig. 6a the circuit diagram corresponds functionally with the logical diagram shown in Fig. 6.

The operation of the circuit is more readily undersandable when considered in connection with Fig. 6 and Table I.

The tubes 201L and 201R have their plates connected to the +150 volt line 105 and their cathodes commonly connected through load resistor 202 to the −150 volt line 130. Parasitic suppressor resistors 203 are connected to the control grid of each tube. These cathode follower tubes comprise OR circuit 170 and when the terminal 16-8 is Up, the output lead 173 is Up, denoting the presence of carry. AND circuit 171a comprises diode rectifiers 205 and 206 and the pull up resistor 207. When the lead 175 connected to the juncture of diodes 205 and 206 is Up, the output lead 173 is Up, causing the output terminal 23-10 to go Up thereby indicating the presence of carry or a 10 bit. OR circuit 172 comprises the diode rectifiers 208 and 208d and the pull down resistor 209 connected to the −150 volt line 130. The inputs to OR circuit 172 or the plates of the diodes 208d and 208 are connected respectively to input terminals 15-4 and 15-2. Hence, if either a 4 (0100) or a 2 (0010) are present at those respective terminals, the lead 174 connecting the juncture of diodes 208 and 208d to the cathode of diode 206 of AND circuit 171a is Up. The cathode of diode 205 is connected to the input terminal 15-8. Hence, the lead 175 connected to the juncture of diodes 205 and 206 of AND circuit 171a is Up when an 8 (1000) is present at input terminal 15-8 and a 4 (0100) or a 2 (0010) is present at input terminal 15-4 or input terminal 15-2, respectively. Since all decimal sums between 10 to 19 inclusive are represented by input terminal 16-8 being in the Up condition, or input terminal 15-8 being in the Up condition and input terminal 15-4 or input terminal 15-2 being in the Up condition, it is seen that the output terminal 23-10 will be in the Up condition when the decimal sum is over 9 (1001). The inverter 177 comprises amplifier tube 211L and cathode follower tube 211R. The cathode of tube 211L is connected to ground and its plate is connected through load resistor 212 to the +150 volt line 105 and through resistor 213 and frequency compensating condenser 214, in parallel, to the control grid of tube 211R. Resistor 215 connected to the grid of tube 211R and the −150 volt line 130 with resistors 213 and 212 comprise a voltage divider. The cathode of cathode follower tube 211R is connected through a dropping resistor 215r and load resistor 216 to the −150 volt line 130. When the control grid of tube 211L is Up its plate is Down, the control grid of cathode follower tube 211R is Down and the cathode of tube 211R is Down. Hence, when the control grid of the tube 211L is Up, the cathode of tube 211R is Down and vice versa. It, therefore, follows that the cathode of tube 211R and juncture 178 are Up when the decimal sum is between 0 to 9 inclusive.

The OR circuit 179 comprises cathode follower tubes 217L and 217R having their plates commonly connected to the +150 volt line 105 and their cathodes commonly connected through dropping resistor 215r and load resistor 218 to the −150 volt line 130. The control grid of the tube 217L is connected to the cathode of tube 211R and the control grid of the tube 217R is connected to the input terminal 15-2. The control grids of tubes 217L and 217R and their commonly connected cathodes, are therefore, Up when either the cathode of tube 211R or the terminal 15-2 is Up. The inverter circuit 181 comprising tubes 219L and 219R is similar to inverter circuit 177. However, the cathode circuit of tube 219R is included as part of OR circuit 185 which also includes tube 220 having its plate connected to the +150 volt line 105, its cathode connected to the cathode of tube 219R and its control grid connected to the plate of diode rectifier 221. The output cathode of inverter circuit 181 is Up when the OR circuit 179 is Down and is therefore Up when the sum is either 12, 13, 16 or 17. This cathode is connected to the output terminal 20-2. AND circuit 183a comprises diode rectifiers 221 and 222 having their cathodes connected respectively to the cathode of tube 211R and the input terminal 15-2 and the pull up resistor 223 commonly connected to the plates of diode rectifiers 221 and 222 and to the +150 volt line 105. The cathode of tube 211R and the input terminal 15-2 are Up only when the sum is either 2, 3, 6 or 7. Consequently, the cathode of tube 220 and of tube 219R and the output terminal 20-2 are also Up when the sum is 2, 3, 6 or 7. OR circuit 187 comprises the diode rectifiers 225 and 226 having their plates connected respectively to the input terminal 15-4 and the output of OR circuit 179, and the pull down resistor 227 connected from the juncture of the cathodes of diode rectifiers 225 and 226 to the −150 volt line 130. Inverter 190 comprising the tubes 229L and 229R is similar to the inverters 177 and 181. The cathode circuit of tube 229R is included as part of the OR circuit 193 and is connected to the cathode of tube 231 having its control grid connected to the plates of diode rectifiers 232 and 233 and its plate connected to the +150 volt line 105. The output of OR circuit 187 is Up when the sum is either 0 to 15, 18 or 19. The cathode of tube 229R and output terminal 21-4 connected thereto are therefore Up when the sum is either 16 or 17.

AND circuit 188a comprises diode rectifiers 232 and 233 having their cathodes connected to the input terminal 15-4 and the output of OR circuit 179 respectively, and pull up resistor 234 connected between the +150 volt line 105 and the juncture of the commonly connected plates of diode rectifiers 232 and 233. The lead 192 connected to the output of AND circuit 188a is Up only when the input terminal 15-4 is Up and the output of OR circuit 179 is Up. The cathodes of tubes 231 and 229R and the output terminal 21-4 are Up when the lead 192 is Up or when the sum is either 4, 5, 6, 7, 14 or 15.

AND circuit 195a comprises diode rectifiers 236 and 237 having their cathodes connected respectively to the cathode of tube 211R and the input terminal 15-8, and pull up resistor 238 connected between the +150 volt line 105 and the juncture of the commonly connected plates of diode rectifiers 236 and 237. OR circuit 199 is similar to OR circuit 179 and comprises the tubes 239L and 239R. The control grid of tube 239R is connected to the juncture of the plates of diode rectifiers 236 and 237. When the cathode circuit of tube 211R is Up and the input terminal 15-8 is Up, the control grid of tube 239R, cathode circuit of tube 239R and the output terminal 22-8 are Up, i.e. when the sum is either 8 or 9. AND circuit 197a comprises diode rectifiers 241 and 242 having their plates connected respectively to the input terminal 16-8 and the input terminal 15-2, and pull up resistor 243 connected between the +150 volt line 105 and the plates of diode rectifiers 241 and 242. The juncture of the plates of diodes 241 and 242 is also connected to the control grid of tube 239L. Hence, when the input terminals 16-8 and 15-2 are Up, the control grid of tube 239L is Up, and the cathode circuit of tube 239L is Up and the terminal 22-8 connected thereto is also Up, i.e. when the sum is either 18 or 19.

Referring more particularly to Fig. 7 there is shown a logical or block diagram for the rationalizer of Fig. 1. The OR circuit 170, AND circuit 171a and OR circuit 172 are as shown in Fig. 6 and provide a 10 bit at the output terminal 23-10 when the decimal sum is between 10-19 inclusive. The inverter 177, AND circuits 195a and 197a, and OR circuit 199 are also as shown in Fig. 6. The output terminal 22-8 is therefore in the Up condition when the decimal sum is either 8, 9, 18 or 19.

AND circuit 250a receives inputs from the juncture 178 and the input terminal 15-4 and provides an output which is Up when the decimal sum is either 4, 5, 6 or 7. Three-input AND circuit 251a receives inputs from the input terminals 15-2, 15-4 and 15-8 and therefore its output is Up when the decimal sum is either 14 or 15. AND circuit 252a receives inputs from the lead 173 which is Up when the decimal sum is between 10 to 19 inclusive and from input terminal 15-2. The output of AND circuit 252a is therefore Up when the decimal sum is either 10, 11, 14, 15, 18 or 19. The output of AND circuit 252a provides the input to inverter 253 whose output is Up when the decimal sum is either 0 to 9, 12, 13, 16 or 17. The output of inverter 253 and input terminal 16-8 are connected to supply the inputs to AND circuit 254a. The output of AND circuit 254a is therefore Up when the decimal sum is either 16 or 17. The outputs of AND circuits 250a, 251a, and 254a supply the inputs to OR circuit 255 having its output connected to the output terminal 21-4. Since the output of OR circuit 255 is Up when the output of any one of the AND circuits 250a and 251a and 254a is Up, the output terminal 21-4 is Up when the decimal sum is either 4, 5, 6, 7, 14, 15, 16 or 17.

OR circuit 256 receives its inputs from the lead 173 and from the input terminal 15-2 and therefore provides an output which is Up when the decimal sum is either 2, 3, 6, 7, 10 to 19 inclusive. The outputs of inverter 253 and OR circuit 256 supply the input to AND circuit 257a having its output connected to the output terminal 20-2. Output terminal 20-2 is therefore Up when the outputs of inverter 253 and OR circuit 256 are Up or when the decimal sum is either 2, 3, 6, 7, 12, 13, 16 or 17.

Referring more particularly to Fig. 8 there is shown in logical diagram form another embodiment of the rationalizer shown in Fig. 1. OR circuit 170, AND circuit 171a, OR circuit 172, inverter 177, AND circuit 195a, AND circuit 197a, AND circuit 250a and OR circuit 199 correspond to the similarly designated circuits in Fig. 7. Hence, it is seen that the outputs are provided at the output terminals 22-8 and 23-10 in exactly the same manner as explained in connection with Fig. 7.

AND circuit 260a receives inputs from the terminals 15-2 and 15-4 and its output is therefore Up when the decimal sum is either 6, 7, 14 or 15. Inverter 261 is connected to the input terminal 15-2 and therefore provides an output which is Up when the decimal sum is either 0, 1, 4, 5, 8, 9, 12, 13, 16 or 17. The output of inverter 261 serves as one of the inputs to the two-input AND circuit 262a which receives its other input from the input terminal 16-8. The output of AND circuit 262a is therefore Up when the decimal sum is either 16 or 17. The outputs of AND circuits 250a, 260a and 262a supply the inputs to the three-input OR circuit 264 having its output connected to the output terminal 21-4. The output terminal 21-4 is therefore Up when the decimal sum is either 4, 5, 6, 7, 14, 15, 16 or 17. The two-input AND circuit 265a receives inputs from the inverter 177 and from the input terminal 15-2. The output of AND circuit 265a is therefore Up when the decimal sum is either 2, 3, 6 or 7. The three-input AND circuit 266a receives inputs from the inverter 261, input terminal 15-4, and input terminal 15-8. The output of AND circuit 266a is therefore Up only when all three of its inputs are Up or when the decimal sum is either 12 or 13. The three-input OR circuit 267 having its output connected to output terminal 20-4 receives its inputs from the AND circuits 262a, 265a and 266a and provides an output when the outputs of any one or more of those AND circuits is in the Up condition or when the decimal sum is either 2, 3, 6, 7, 12, 13, 16 or 17.

Figure 9A:
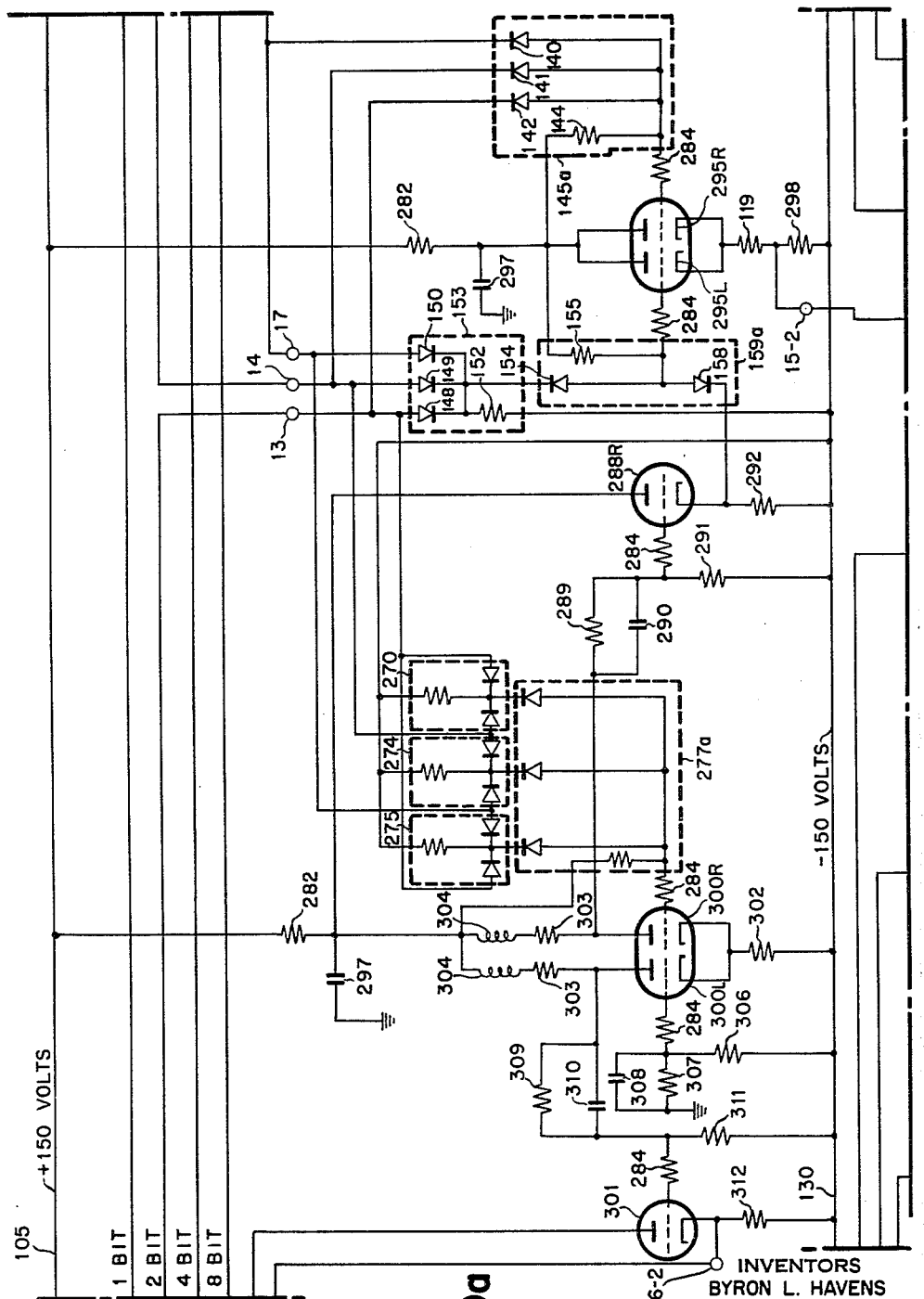

Referring more particularly to Figs. 9, 9a, 9b and 9c, there is shown a complete circuit diagram of the binary adders shown in Fig. 1. This diagram is realized when Fig. 9a is placed to the left of Fig. 9, Fig. 9b to the left of Fig. 9a and Fig. 9c to the left of Fig. 9b.

The binary adder for the 1 bit is shown in Fig. 9. OR circuit 270 includes diode rectifiers 271 and 272 having their cathodes commonly connected through a pull down resistor 273 to the −150 volt line 130. OR circuits 274 and 275 are similar to OR circuit 270. Input terminal 13 is commonly connected to the plates of rectifiers 271 and 272 of OR circuits 270 and 275 respectively. Input terminal 14 is connected to the plates of rectifiers 272 and 271 of the OR circuits 270 and 274 respectively and input terminal 17 is connected to the plates of rectifiers 272 and 271 of OR circuits 274 and 275 respectively. AND circuit 277a comprises the rectifiers 278, 279 and 280 having their plates commonly connected through a pull up resistor 281 and decoupling resistor 282 to the +150 volt line 105. The cathodes of rectifiers 278, 279 and 280 are connected to the commonly connected cathodes of the rectifiers of OR circuits 270, 274 and 275 respectively. It is seen from inspection of the OR circuits 270, 274 and 275 that all of these commonly connected cathodes are Up when either two or three of the input terminals 13, 14 and 17 are Up. Hence, when two or three of inputs 13, 14 and 17 are Up the commonly connected plates of the rectifiers 278, 279 and 280 of AND circuit 277a are Up and the control grid of tube 283 connected thereto through parasitic suppressor resistor 284 is Up. The plate of tube 283 is connected to the +150 volt line 105 through resistor 282 and its cathode is connected through dropping resistor 119 and load resistor 285 to the −150 volt line 130. The terminal 16–1 connected to the juncture of the resistors 119 and 285 is therefore Up when either two or three inputs are applied to the input terminals 13, 14 and 17. This juncture is also connected through limiting resistor 287 to the control grid of inverter tube 288L having its cathode grounded and its plate connected through load resistor 288 and decoupling resistor 282 to the +150 volt line 105. The plate of tube 288L is connected through resistor 289 and frequency compensating capacitor 290, in parallel, and parasitic suppressor resistor 284 to the control grid of cathode follower tube 288R. The resistors 289 and 291 connected between the plate of tube 288L and the −150 volt line 130 comprise a voltage divider for biasing the control grid of cathode follower tube 288R. The cathode of tube 288R is connected through load resistor 292 to the −150 volt line 130. The control grid of inverter tube 288L is Up when either two or three inputs are applied to the input terminals 13, 14 and 17. The plate of tube 288L is therefore Up when one or no inputs are applied. Accordingly, the control grid and cathode of cathode follower tube 288R is Up when one input or no input is applied to the input terminals 13, 14 and 17.

OR circuit 153 is connected to input terminals 13, 14 and 17 so that its output connected to the cathode of diode rectifier 154 of AND circuit 159a is Up when either one, two or three inputs are applied to the input terminals. The cathode of cathode follower tube 288R is connected to the cathode of rectifier 158 of AND circuit 159a which is Up when either one input or no input is applied to the input terminals. The control grid of tube 295L connected to the output of AND circuit 159a is therefore Up only when one input is applied to the input terminals. The cathodes of the three diode rectifiers of AND circuit 145a are each connected to a different one of the input terminals. The control grid of tube 295R connected to receive the output of AND circuit 145a is therefore Up only when three inputs are applied to the input terminals. The plates of tubes 295R and 295L are commonly connected through decoupling resistor 282 to the +150 volt line 105 and to ground through condenser 297. The cathodes of tubes 295R and 295L are commonly connected through dropping resistor 119 and load resistor 298 to the −150 volt line 130. Since the cathodes of the cathode follower tubes 295R and 295L are commonly connected, it is seen that they collectively serve as a two-input OR circuit. The control grid of the tube 295R is Up only when three inputs are applied to the input terminals and the control grid of the tube 295L is Up only when one input is applied to the input terminal. The output terminal 15–1 is therefore Up only when one or three inputs are applied to the input terminals 13, 14 and 17.

Referring to Fig. 9a the tubes 295L, 295R and 288R and the circuitry associated therewith are identical with that shown for the 1 bit adder in Fig. 9. The output terminal 15–2 is therefore Up when one or three inputs are applied to the input terminals 13, 14 and 17. The tubes 300L, 300R and 301 and the circuitry associated therewith are provided to reestablish the Up and Down voltage levels and are commonly referred to as a carry shaping circuit. The cathodes of tubes 300L and 300R are commonly connected through load resistor 302 to the −150 volt line 130 and each of their anodes are connected through a resistor 303 and peaking inductance 304 to decoupling resistor 282 connected to the +150 volt line 105. Resistors 306 and 307 connected between the −150 volt line 130 and ground comprise a voltage divider. The juncture of these resistors is connected through the suppressor resistor 284 to the control grid of tube 300L. By-pass condenser 308 is connected in parallel with the resistor 307. The voltage divider causes the control grid of the tube 300L to be held by a fixed bias such that the tube is normally plate current conductive. The plate of tube 300L is connected through resistor 309 and capacitor 310 in parallel to the parasitic suppressor resistor 284 connected to the control grid of the tube 301. Resistor 311 connected between resistor 309 and the −150 volt line 130 in conjunction with the resistors 309, 303 and 282 comprise a voltage divider which determines the bias applied to the control grid of the tube 301. The cathode of tube 301 is connected to the carry output terminal 16–2 and through a resistor 312 to the −150 volt line 130.

The control grid of the tube 300R is Down when no input or one input is applied to the terminals 13, 14 and 17 and its plate is therefore Up. When either two or three inputs are applied to the input terminals 13, 14 and 17 the OR circuits 270, 274 and 275 are all operative to cause the AND circuit 277a to become operative thereby causing the voltage at the control grid of tube 300R to go Up. The plate of tube 300R is therefore Down when either two or three inputs are applied to the terminals 13, 14 and 17 and is Up when no input is applied and when one input is applied. The control grid of tube 288R connected thereto through a voltage divider consisting of resistors 289 and 291 and its cathode are also Up when no input is applied or when one input is applied. The output terminal 15–2 therefore is Up when either one or three inputs are applied to the input terminals 13, 14 and 17.

When either two or three inputs are applied to the input terminals 13, 14 and 17, the cathode of tube 300R and the cathode of tube 300L connected thereto go Up. The voltage rise at the cathode of tube 300L is sufficient to cause the voltage at the control grid of tube 300L to be negative with respect to the voltage at the cathode. As a result the tube 300L becomes non-conductive, i.e. no current flows in its plate circuit. The plate of tube 300L therefore goes Up when either two or three inputs are applied to the input terminals 13, 14 and 17. The control grid and cathode of cathode follower tube 301 accordingly are Up when either two or three inputs are applied to the input terminals 13, 14 and 17 and are Down when one input is applied or when no input is applied. When the control grid of tube 300R again goes Down, the commonly connected cathodes of tubes 300R and 300L go Down and the voltage difference between the cathode and the control grid of the tube 300L is sufficient to again cause tube 300L to become plate current conductive and its plate to go Down. The carry output terminal 16–2 is therefore Up when either two or three inputs are applied and Down when no input or one input is applied to the input terminals 13, 14 and 17. True binary carry is therefore provided at terminal 16–2.

Figure 9B:
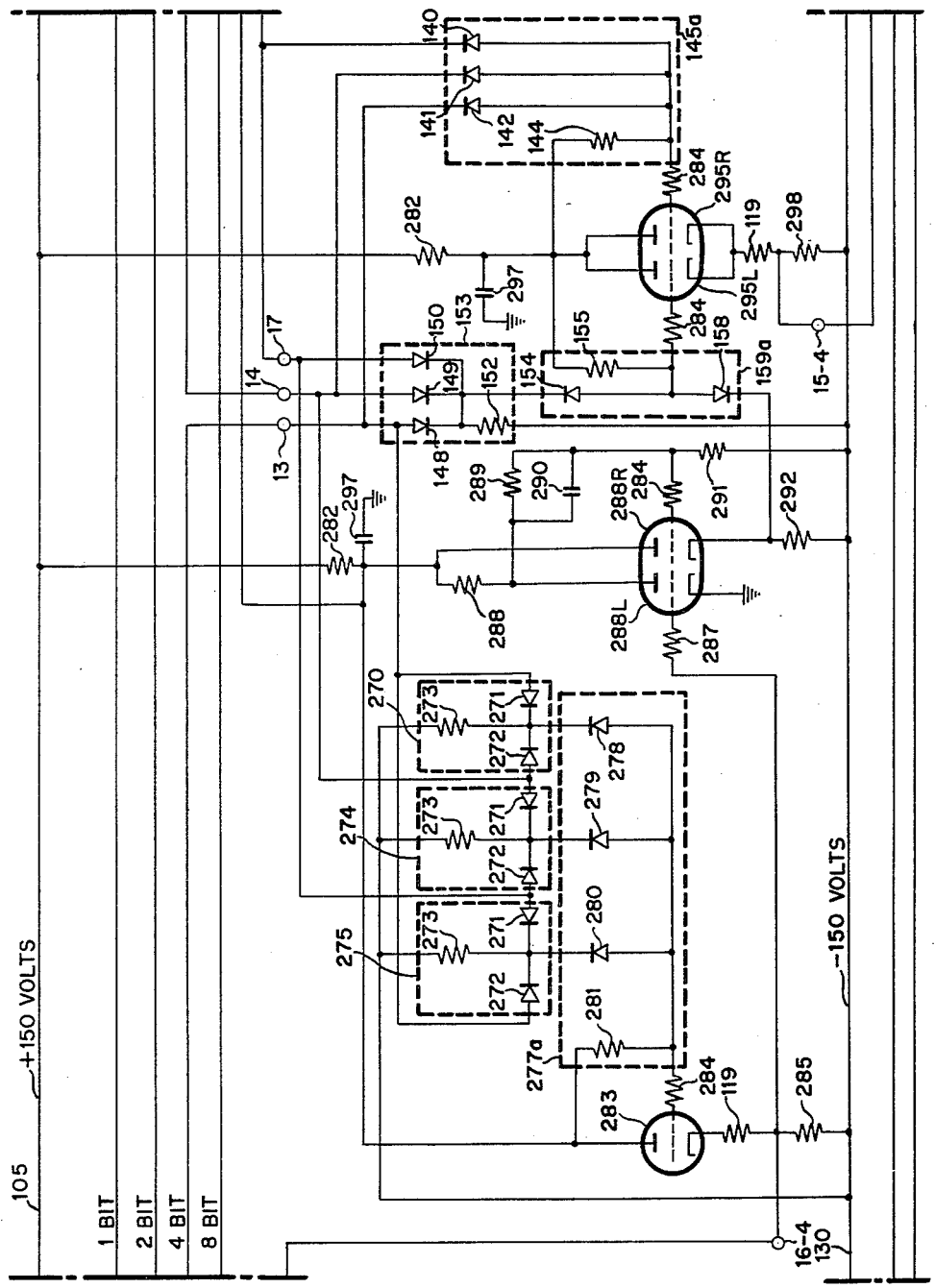

Fig. 9b shows the circuit diagram for the 4 bit adder. This circuit is identical with that of the 1 bit adder shown in Fig. 9.

Referring to Fig. 9c, the 8 bit binary adder includes OR circuits 270, 274 and 275 and AND circuit 277a functioning to place the control grid and the cathode of the tube 315L in the Up condition when either two or three inputs are applied to the input terminals 13, 14 and 17. The 8 bit binary adder is electrically identical to the 1 bit adder of Fig. 9, except that the AND circuit 145a and its associated cathode follower 295R of Fig. 9 are omitted. This omission is permissible because three inputs will never be Up in any legitimate addition of two numbers in the binary-decimal system. The cathode of tube 315L is connected through load resistor 316 to the −150 volt line 130 and through limiting resistor 287 to the control grid of tube 315R having its cathode grounded and its plate connected through load resistor 317 and decoupling resistor 282 to the +150 volt line 105. When the cathode of tube 315L goes Up the control grid of tube 315R connected thereto goes Up and the plate of tube 315R goes Down. Hence, the control grid of the tube 320L is Up for one input and no input. The cathode of tube 320L is connected through a resistor 321 to

17 the −150 volt line 130 and to one input of AND circuit 159a. The other input of AND circuit 159a or the cathode of diode rectifier 154 is supplied by OR circuit 153. The cathode of diode rectifier 154 is therefore Up for one, two or three inputs and the cathode of diode rectifier 158 is Up when one input is applied or no input is applied. The cathode of the diode rectifiers or the two inputs to the AND circuit are therefore Up simultaneously only when one input is applied to the input terminals 13, 14 and 17. The control grid of cathode follower tube 320R is therefore Up only when one input is applied to the input terminals. The cathode of cathode follower tube 320R is connected through load resistor 321 to the −150 volt line 130 and to the output terminal 15-8. This output terminal is therefore Up only when one input is applied.

It should be noted that output terminal 15-8 is Up only when one input is applied whereas in the 1, 2 and 4 bit adders the corresponding output terminal was Up when either one or three inputs were applied to the input terminals and to insure that such was the case, the AND circuit 145a was provided. Such is not required for the 8 bit adder because three inputs are never applied in that such would produce a sum of 24. The greatest sum permitted in the addition is 19 (1,0011).

Referring to Fig. 10 the complete circuit diagram of the novel adder is realized by now placing Fig. 10 underneath Fig. 9c which connects the terminals 15-2, 15-4, 15-8 and 16-8 to the corresponding numbered terminals of the 2 bit, 4 bit and 8 bit adders shown in Figs. 9, 9a 9b and 9c. The binary decimal output of the adder appears at the output terminals 15-1, 20-2, 21-4, 22-8 and 23-10 of Fig. 10.

In Fig. 10 the carry or 10 bit output at terminal 23-10 is procured by OR circuits 170 and 172 and AND circuit 171a which are connected and operated as shown and described in connection with Fig. 6a. The inverter 177 is also connected and operated as described in connection with Fig. 6a except that the resistor 215 is connected to the −150 volt line 130 through a decoupling resistor 330 and to ground through a decoupling capacitor 331. Inverter circuit 261 comprises tubes 332L and 332R. Cathode follower tube 332R has its cathode connected to the −150 volt line 130 through load resistor 334 and its plate connected through decoupling resistor 282 to the +150 volt line 105. The plate of tube 332L is connected to the +150 volt line 105 through load resistor 335 and decoupling resistor 282, and through resistor 336 and frequency compensating capacitor 337 to the parasitic suppressor resistor 284 which is also connected to the control grid of the tube 332R. The resistor 284 is also connected through divider resistor 338 and resistor 330 to the −150 volt line 130.

AND circuit 197a has the cathodes of its diode rectifiers 241 and 242 connected to input terminals 15-2 and 16-8 respectively and its output or common juncture of the plates of the rectifiers is connected through resistor 284 to the control grid of the tube 239L of OR circuit 199. The cathodes of rectifiers 237 and 236 of AND circuit 195a are connected respectively to the input terminal 15-8 and cathode of the tube 211R of inverter 177. The common juncture of the plates of diode rectifiers 236 and 237 is connected through resistor 284 to the control grid of the tube 239R of OR circuit 199. The output terminal 22-8 is connected to the cathode output of tubes 239L and 239R so that terminal 22-8 is Up when the grid of either of these tubes is Up. The cathodes of diode rectifiers 340 and 341 of AND circuit 250a are connected respectively to the cathode of tube 211R of inverter circuit 177 and to the input terminal 15-4. The common juncture of the plates of rectifiers 340 and 341 is connected through resistor 284 to the control grid of tube 342L of the three-input OR circuit 264. The juncture of the plates of rectifiers 340 and 341 is also connected through a pull up resistor 344 and resistor 282 to

18 the +150 volt line 105. The control grid of tube 342L is Up when the juncture of the plates of rectifiers 340 and 341 is Up or when the cathode of tube 211R of inverter 177 and the input terminal 15-4 are Up. The cathodes of rectifiers 345 and 346 of AND circuit 260a are connected to the input terminals 15-4 and 15-2 respectively. The common juncture of the plates of rectifiers 345 and 346 is connected through pull up resistor 347 and resistor 282 to the +150 volt line 105 and through resistor 284 to the control grid of the tube 342R. The cathodes of diode rectifiers 350 and 351 of AND circuit 262a are connected respectively to the cathode of tube 332R of inverter circuit 261 and the input terminal 16-8. The juncture of the commonly connected plates of diode rectifiers 350 and 351 is connected through pull up resistor 352 and resistor 282 to the +150 volt line 105 and through resistor 284 to the control grid of the tube 353L. AND circuits 250a, 260a and 262a therefore supply the three inputs to the OR circuit 264 to cause conduction through the tubes 342L, 342R and 353L respectively. The cathodes of these tubes are commonly connected through resistor 203 and load resistor 354 to the −150 volt line 130. The juncture of resistors 203 and 354 is connected to the output terminal 21-4.

Th juncture of diode rectifiers 350 and 351 of AND circuit 262a is also connected through a resistor 284 to the control grid of the tube 353R. The cathodes of diode rectifiers 356 and 357 are connected respectively to the cathode of tube 211R of inverter circuit 177 and to the input terminal 15-2. The juncture of the commonly connected plates of the diode rectifiers 356 and 357 is connected through pull up resistor 358 and resistor 282 to the +150 volt line 105. This juncture is also connected through resistor 284 to the control grid of the tube 360L. The cathodes of rectifiers 361, 362 and 363 of AND circuit 266a are connected respectively to the cathode of tube 332R of inverter circuit 261, input terminal 15-8, and input terminal 15-4. The commonly connected plates of diode rectifiers 361, 362 and 363 are connected through pull up resistor 364 and resistor 282 to the +150 volt line 105 and through resistor 284 to the control grid of the tube 360R. AND circuits 262a, 265a and 266a therefore supply the three inputs to OR circuit 267. The cathodes 353R, 360L and 360R are commonly connected through resistor 203 and 354 to the −150 volt line 130, and the juncture of load resistor 354 and resistor 203 is connected to the output terminal 20-2. Hence, output terminal 20-2 is Up when the cathode of one or more of the tubes 353L, 360L and 360R is Up.

The output terminals 20-2, 21-4, 22-8 and 23-10 provide outputs as indicated for the Up condition of the terminals in Fig. 8. These output terminals with output terminal 15-1 therefore provide the sum in the binary-decimal system of the inputs applied to the input terminals 12 (Fig. 9) and 11 (Fig. 9c).

It should be noted that the rationalizer of the invention senses the sum of the binary addition and provides an output in the binary-decimal system. Since such is the case, if the binary addition represents a decimal sum greater than 9, the rationalizer effectively adds 6 to that sum. In affecting the change from the binary to the binary-decimal system, the rationalizer does not actually add a pulse or count to the binary sum and neither does it provide a pulse or pulses to be added to this sum in the rationalizer or by the binary adders. The conversion to the binary-decimal system is effected solely by the novel coincidence circuitry shown.

The carry output terminal 23-10 of the rationalizer is connected through delay circuit 25 to the carry input terminal 17 of the 1 bit adder (Fig. 9). As stated in connection with Fig. 1 such provides a carry input pulse to the next decimal column to be added.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A binary-decimal adder having a plurality of input terminal groups, each group for receiving binary bits simultaneously for an equal number of corresponding binary orders; a binary adder for each binary order, each adder being connected to add the binary bits of one binary order; an output terminal for each binary adder for electrically manifesting the sum provided by that order adder; a carry terminal for each binary adder for electrically manifesting the carry from that order; a connection from the carry terminal of each binary adder, except the adder for the highest binary order, to the input of the adder for the next higher binary order; a delay circuit coupled between the carry terminal of the binary adder for the highest binary order and the input of the binary adder for the lowest binary order for applying an electrical manifestation of a carry to the binary adder for the lowest order when binary bits to be added are next received by that binary order; a rationalizer connected to receive an electrical manifestation of the output of each binary adder, except that for the lowest binary order, and an electrical manifestation of a carry output of the adder for the highest order and having; first circuit means for indicating a sum greater than 9 and applying an input to said delay circuit when the sum is greater than 9 said first circuit means including, a first OR circuit having inputs connected to the outputs of the binary adders for two preselected binary orders and an output, an AND circuit having inputs connected to the output of the binary adder for a third preselected binary order and the output of said first OR circuit and an output, and a second OR circuit having inputs connnected to the carry terminal of the binary adder for the highest binary order and to the output of the AND circuit and an output connected to the input of said delay circuit; and second circuit means connected to be responsive to a sum greater than 9 to effectively add 6 thereto, said second circuit means including pulse transfer and coincidence circuits connnected to be energized by the output of preselected ones of said binary adders and the output of said AND circuit.

2. An electronic parallel binary-coded-decimal adder for simultaneously adding binary bits manifested electrically and representing the digit of each decimal column of each decimal number to be added in binary-decimal notation, said electronic parallel binary decimal adder consisting in combination of: a first group of input terminals for accepting a first decimal number expressed in binary-coded-decimal notation, parallel by binary bit, serial by decimal order and consisting of a 1 bit terminal, a 2 bit terminal, a 4 bit terminal, and an 8 bit terminal; a second group of input terminals for accepting a second decimal number expressed in binary-coded-decimal notation, parallel by binary bit, serial by decimal order and consisting of a 1 bit terminal, a 2 bit terminal, a 4 bit terminal, and an 8 bit terminal; a group of output terminals for rendering an output manifestation representative of the sum of said first and decimal numbers expressed in binary-coded-decimal notation parallel by binary bit, serial by decimal order and consisting of a 1 bit terminal, a 2 bit terminal, a 4 bit terminal and an 8 bit terminal; a 1 bit binary adder having first, second and third input terminals, a sum output terminal and a carry output terminal; a 2 bit binary adder having first, second and third input terminals, a sum output terminal and a carry output terminal; a 4 bit binary adder having first, second and third input terminals, a sum output terminal, and a carry output terminal; an 8 bit binary adder having first, second and third input terminals, a sum output terminal, and a carry output terminal; a direct connection between said 1 bit terminal of said first group of input terminals and said second input terminal of said 1 bit binary adder; a direct connection between said 1 bit terminal of said second group of input terminals and said third input terminal of said 1 bit binary adder; a direct connection between said 2 bit terminal of said first group of input terminals and said second input terminal of said 2 bit binary adder; a direct connection between said 2 bit terminal of said second group of input terminals and said third input terminal of said 2 bit binary adder; a direct connection between said 4 bit terminal of said first group of input terminals and said second input terminal of said 4 bit binary adder; a direct connection between said 4 bit terminal of said second group of input terminals and said third input terminal of said 4 bit binary adder; a direct connection between said 8 bit terminal of said first group of input terminals and said second input terminal of said 8 bit binary adder; a direct connection between said 8 bit terminal of said second group of input terminals and said third input terminal of said 8 bit binary adder; a direct connection between said carry output terminal of said 1 bit binary adder and said first input terminal of said 2 bit binary adder; a direct connection between said carry output terminal of said 2 bit binary adder and said first input terminal of said 4 bit binary adder; a direct connection between said carry output terminal of said 4 bit binary adder and said first input terminal of said 8 bit binary adder; a first OR circuit having, a first input terminal connected to said sum output terminal of said 2 bit binary adder, a second input terminal connected to said sum output terminal of said 4 bit binary adder, and an output terminal; a first AND circuit having a first input terminal connected to said output terminal of said first OR circuit, a second input terminal connected to said sum output terminal of said 8 bit binary adder, and an output terminal; a second OR circuit having, a first input terminal connected to said output terminal of said first AND circuit, a second input terminal connected to said carry output terminal of said 8 bit binary adder, and an output terminal; a delay circuit connected between the output terminal of said second OR circuit and said first input terminal of said 1 bit binary adder; a first inverter circuit having its input terminal connected to the output terminal of said second OR circuit, and having an output terminal; a second AND circuit having, a first input terminal connected to said sum output terminal of said 8 bit binary adder, a second input terminal connected to said output terminal of said first inverter circuit, and an output terminal; a third AND circuit having a first input terminal connected to said sum output terminal of said 2 bit binary adder, a second input terminal connected to said carry output terminal of said 8 bit binary adder, and an output terminal; a third OR circuit having, a first input terminal connected to said output terminal of said first inverter circuit, a second input terminal connected to said sum output terminal of said 2 bit binary adder, and an output terminal; a fourth AND circuit having, a first input terminal connected to said output terminal of said third OR circuit, a second input terminal connected to said sum output terminal of said 4 bit binary adder, and an output terminal; a fourth OR circuit having, a first input terminal connected to said output terminal of said third OR circuit, a second input terminal connected to said sum output terminal of said 4 bit binary adder, and an output terminal; a fifth AND circuit having, a first input terminal connected to said output terminal of said first Inverter circuit, a second input terminal connected to said sum output terminal of said 2 bit binary adder, and an output terminal; a second Inverter circuit having, an input terminal connected to said output terminal of said fourth OR circuit, and having an output terminal; a third Inverter circuit having, an input terminal connected to said output terminal of said third OR circuit, and having an output terminal; a fifth OR circuit having, a first input terminal connected to said output terminal of said third AND circuit, a second input terminal connected to said output terminal of said second AND circuit, and an output terminal connected to said 8 bit output terminal of said group of output terminals of said parallel binary-coded-decimal adder; a sixth OR circuit having, a first input terminal connected to said output terminal of said fourth AND circuit, a second input terminal connected to said output terminal of said second Inverter circuit, and an output terminal connected to said 4 bit output terminal of said group of output terminals of said parallel binary-coded-decimal adder; a seventh OR circuit having, a first input terminal connected to said output terminal of said fifth AND circuit, a second input terminal connected to said output terminal of said third Inverter circuit, and an output terminal connected to said 2 bit output terminal of said group of output terminals of said parallel binary-coded-decimal adder; and a direct connection between said sum output terminal of said 1 bit binary adder and said 1 bit output terminal of said group of output terminals of said parallel binary-coded-decimal adder.

References Cited in the file of this patent

UNITED STATES PATENTS

| | | |
|---|---|---|
| 2,503,765 | Rajchman et al. | Apr. 11, 1950 |
| 2,668,661 | Stibitz | Feb. 9, 1954 |
| 2,697,549 | Hobbs | Dec. 21, 1954 |
| 2,703,202 | Cartwright | Mar. 1, 1955 |
| 2,705,108 | Stone | Mar. 29, 1955 |
| 2,731,201 | Harper | Jan. 17, 1956 |

OTHER REFERENCES

Progress Report (2) on the Edvac, Moore School of Engineering, University of Pennsylvania, Dec. 7, 1949, pages 1-1-29 and 1-1-30, Figure PY-O-181.

Synthesis of Electronic Computing and Control Circuits, published by Harvard University Press, May 17, 1951, pages 184 to 186.